(12) United States Patent
Wisneski et al.

(10) Patent No.: US 9,312,636 B2
(45) Date of Patent: Apr. 12, 2016

(54) POWER DISTRIBUTION ASSEMBLY HAVING A MECHANICAL ADVANTAGE SYSTEM

(71) Applicant: AEES, Inc., Farmington Hills, MI (US)

(72) Inventors: Alexander T. Wisneski, Plymouth, MI (US); Pat M. McCabe, Lincoln Park, MI (US); Brian R. Masters, Highland, MI (US); Richard J. Kakkuri, Rochester Hills, MI (US); Larry Smith, Toledo, OH (US); Jeff Sodini, Warren, MI (US)

(73) Assignee: AEES, INC., Farmington Hills, MI (US)

( * ) Notice: Subject to any disclaimer, the term of this patent is extended or adjusted under 35 U.S.C. 154(b) by 86 days.

(21) Appl. No.: 14/339,055

(22) Filed: Jul. 23, 2014

(65) Prior Publication Data

US 2015/0031226 A1 Jan. 29, 2015

Related U.S. Application Data

(60) Provisional application No. 61/857,534, filed on Jul. 23, 2013.

(51) Int. Cl.
*H01R 12/52* (2011.01)
*H01R 13/629* (2006.01)
*H01R 13/631* (2006.01)
*B60R 16/023* (2006.01)
*H01R 13/633* (2006.01)

(52) U.S. Cl.
CPC .......... *H01R 13/629* (2013.01); *B60R 16/0238* (2013.01); *H01R 13/631* (2013.01); *H01R 13/6335* (2013.01); *H01R 2201/26* (2013.01)

(58) Field of Classification Search
CPC ...... H01R 12/52; H01R 12/523; H01R 12/73; H01R 13/447
See application file for complete search history.

(56) References Cited

U.S. PATENT DOCUMENTS

| | | | |
|---|---|---|---|
| 5,110,301 A | 5/1992 | Inoue | |
| 5,496,186 A | 3/1996 | Dobbelaere | |
| 5,569,041 A | 10/1996 | Sonobe | |
| 5,795,193 A * | 8/1998 | Yang | H01R 9/2458 439/620.27 |
| 5,921,791 A | 7/1999 | Ono | |
| 5,971,796 A * | 10/1999 | Duhr | H01R 13/516 439/364 |
| 6,036,510 A | 3/2000 | Ono | |
| 6,231,359 B1 | 5/2001 | Inaba | |
| 6,500,015 B2 | 12/2002 | Fukamachi | |
| 6,739,889 B1 * | 5/2004 | Daggett | H01R 13/62938 439/157 |
| 6,926,545 B2 | 8/2005 | Fukamachi | |

(Continued)

*Primary Examiner* — Truc Nguyen
(74) *Attorney, Agent, or Firm* — Howard & Howard Attorneys PLLC

(57) ABSTRACT

A power distribution assembly including a seating tray and a device coupled to the seating tray and at least partially fixed relative to the seating tray. The device defines a first channel and a second channel. The device has a mechanical advantage system in communication with the first and second channels. The power distribution assembly includes a housing selectively coupled to the seating tray and an extension affixed to the housing and movably disposed in the second channel of the device. The extension engages the mechanical advantage system. A power distribution assembly includes an actuator movably disposed in the first channel of the device. The actuator engages the mechanical advantage system. The actuator is movable in a first direction to actuate the mechanical advantage system and translate movement of the actuator to movement of the extension with the housing moving toward the seating tray during the movement of the extension.

25 Claims, 18 Drawing Sheets

(56) References Cited

U.S. PATENT DOCUMENTS

| | | |
|---|---|---|
| 7,066,763 B1 | 6/2006 | Corwin |
| 7,074,063 B1 | 7/2006 | Bailey |
| 7,094,081 B1 * | 8/2006 | Senk ................... H01R 9/2425 |
| | | 439/157 |
| 7,121,847 B1 * | 10/2006 | Jetton ................. H01R 13/527 |
| | | 439/723 |
| 7,241,155 B2 | 7/2007 | Tyler |
| 7,462,047 B2 | 12/2008 | Tyler |
| 7,611,365 B1 | 11/2009 | Ng |
| 7,744,390 B2 | 6/2010 | Tyler |
| 8,047,860 B2 | 11/2011 | Gladd |
| 8,328,568 B2 | 12/2012 | Littek |
| 2005/0186811 A1 * | 8/2005 | Lee ..................... H01R 13/514 |
| | | 439/76.2 |
| 2009/0209117 A1 * | 8/2009 | Polehonki ........... B60R 16/0238 |
| | | 439/76.2 |
| 2013/0095673 A1 * | 4/2013 | Brandon ................ H01R 12/58 |
| | | 439/55 |
| 2015/0288099 A1 * | 10/2015 | Jozwiak ........... H01R 13/62961 |
| | | 439/345 |

* cited by examiner

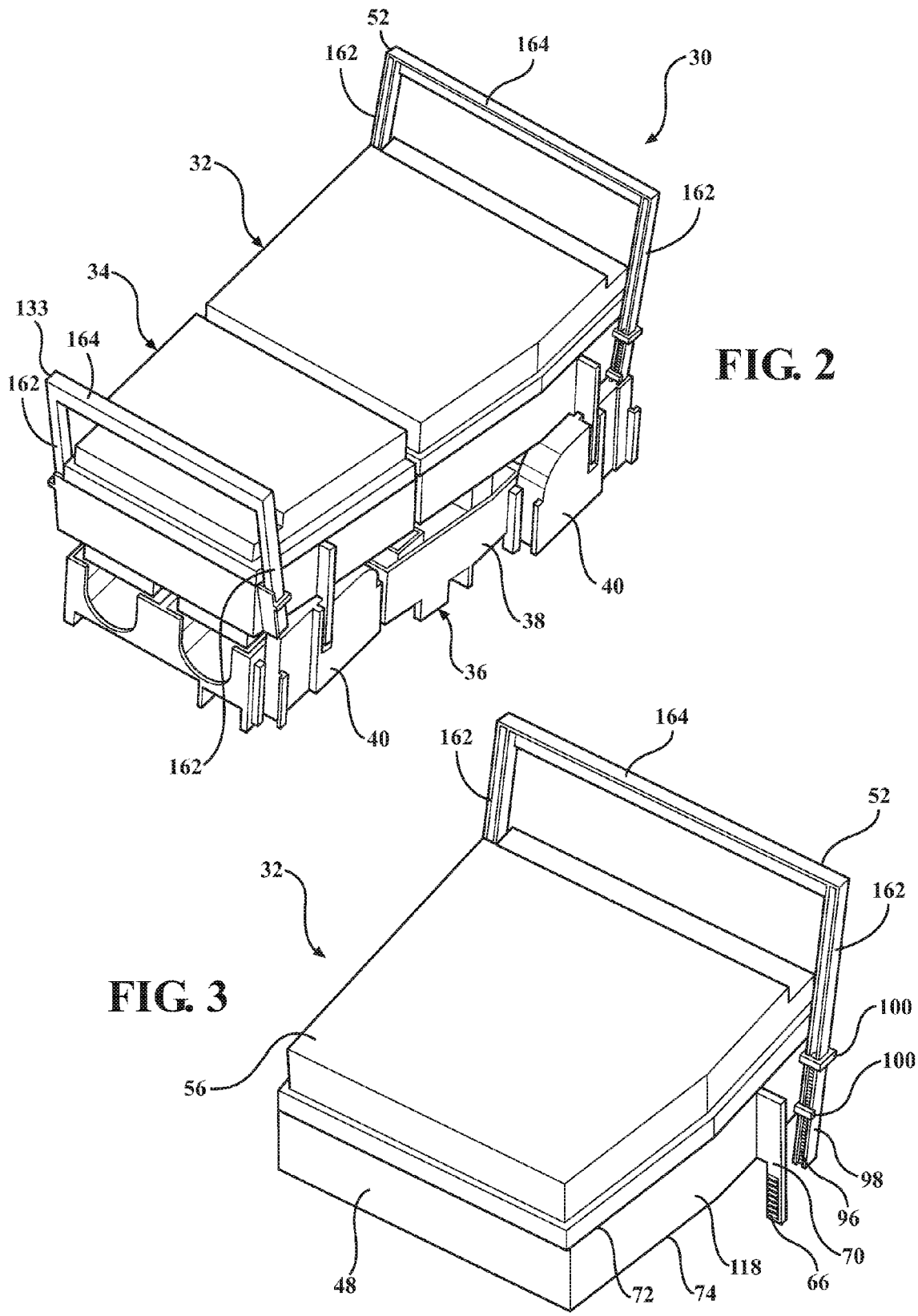

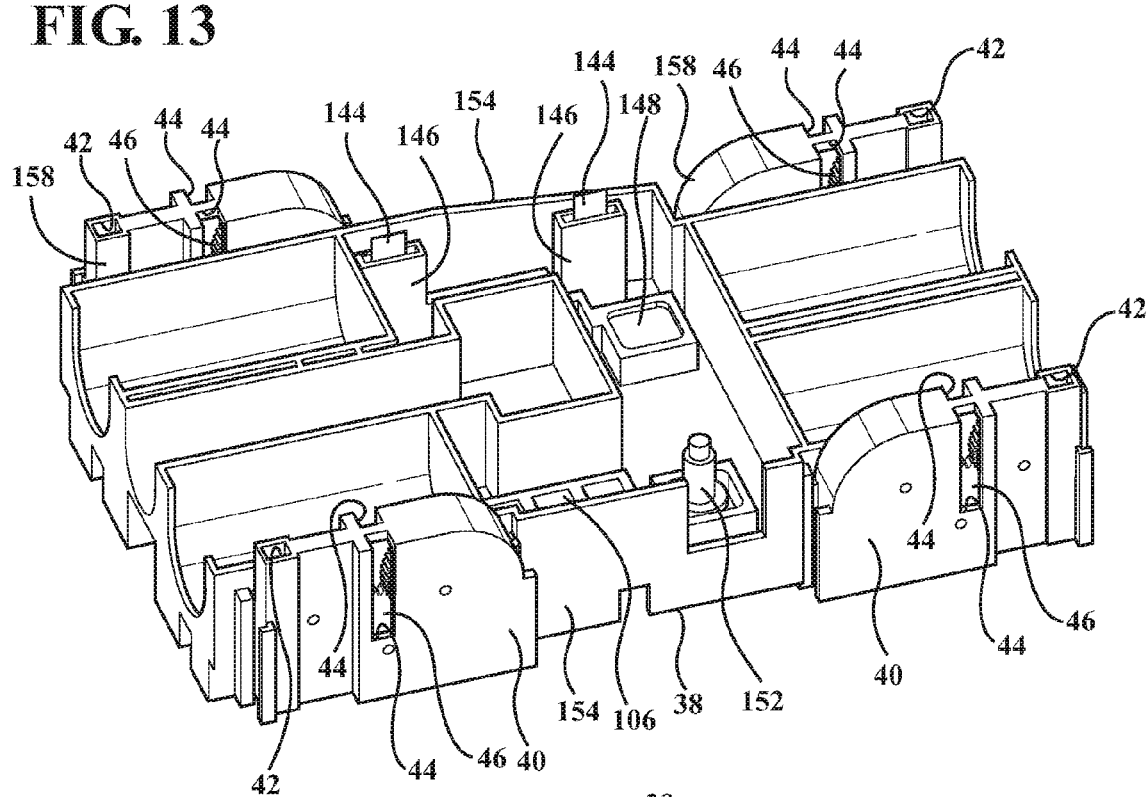
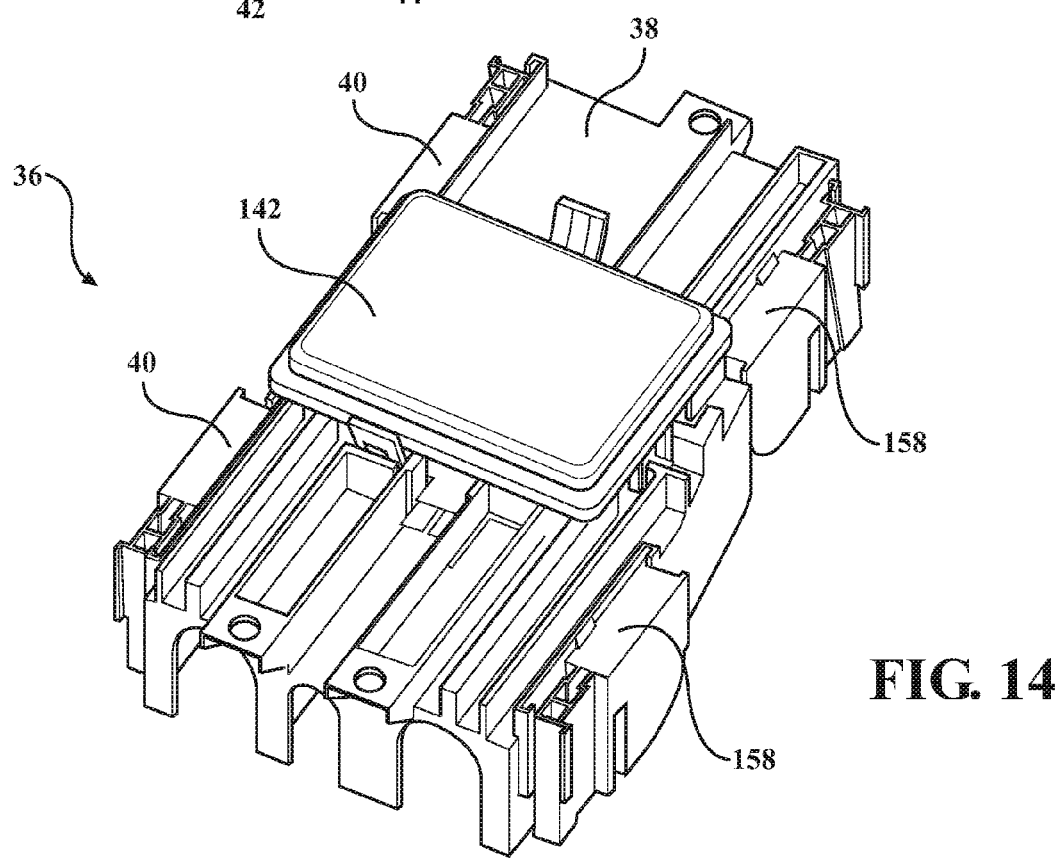

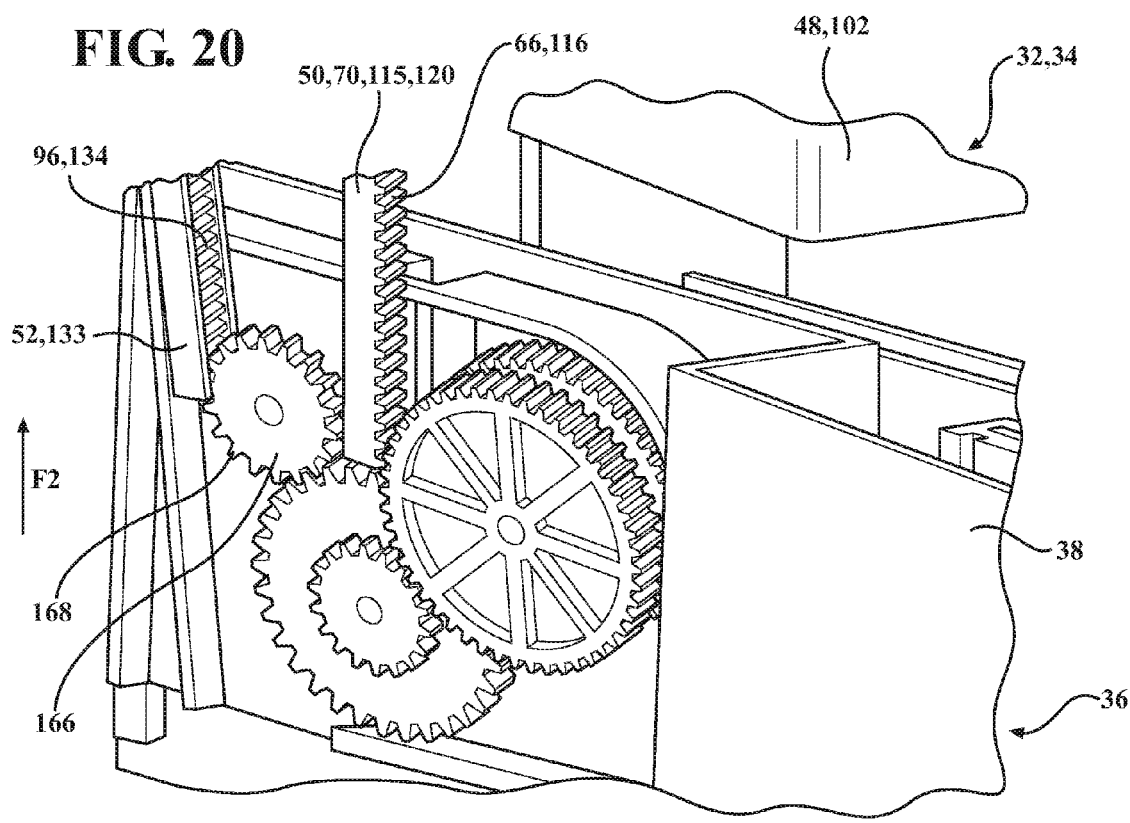
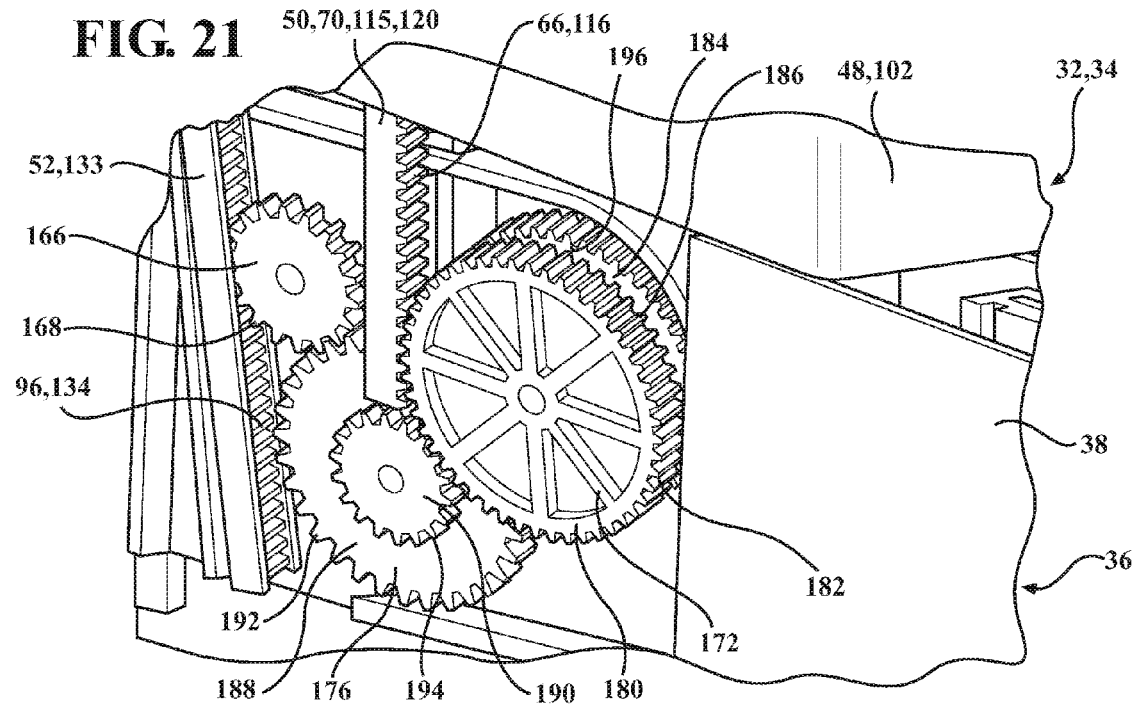

POWER DISTRIBUTION ASSEMBLY HAVING A MECHANICAL ADVANTAGE SYSTEM

CROSS-REFERENCE TO RELATED APPLICATIONS

The subject patent application claims priority to and all the benefits of U.S. Provisional Patent Application No. 61/857,534, which was filed on Jul. 23, 2013 with the United States Patent and Trademark Office.

BACKGROUND OF THE INVENTION

1. Field of the Invention

The present invention generally relates to a mechanical advantage system of a power distribution assembly.

2. Description of Related Art

A power distribution assembly is used in a vehicle for placing multiple electrical components, such as fuses, relays, etc, in a single housing to simplify a vehicle electrical system. The power distribution assembly includes a seating tray and a housing removably coupled to the seating tray. Both the seating tray and housing have electrical components which engage each other and create resistance when coupling the housing to the seating tray.

Although power distribution assemblies are used in many vehicles, design constraints in a vehicular setting are restrictive and limit the open area around the power distribution assemblies for coupling the housing to the seating tray. The limited open area in the vehicle can create difficulties for an operator to evenly seat the housing upon the seating tray. For example, the operator may only be able to use one hand during installation. Additionally, coupling the housing to the seating tray may require a large force from the operator to overcome the resistance from the electrical components of the housing and seating tray engaging each other. Therefore, there remains an opportunity for an improved power distribution assembly.

SUMMARY OF THE INVENTION AND ADVANTAGES

The subject invention includes a power distribution assembly for a vehicle. The power distribution assembly includes a seating tray and a device coupled to the seating tray and at least partially fixed relative to the seating tray. The device defines a first channel and a second channel spaced from the first channel. The device has a mechanical advantage system in communication with the first and second channels. The power distribution assembly includes a housing selectively coupled to the seating tray and an extension affixed to the housing and movably disposed in the second channel of the device. The extension engages the mechanical advantage system. The power distribution assembly includes an actuator movably disposed in the first channel of the device with the actuator engaging the mechanical advantage system. The actuator is movable in a first direction to actuate the mechanical advantage system and translate movement of the actuator to movement of the extension with the housing moving toward the seating tray during the movement of the extension.

Advantageously, since the seating tray includes a mechanical advantage system, the actuator, extension, and device assist the operator with evenly seating the housing upon the seating tray. Further, the force required from the operator to overcome the resistance from the electrical components of the housing and seating tray is reduced.

BRIEF DESCRIPTION OF THE DRAWINGS

Other advantages of the present invention will be readily appreciated, as the same becomes better understood by reference to the following detailed description when considered in connection with the accompanying drawings.

FIG. 2 is a perspective view of the power distribution assembly including a standard content assembly and an optional content assembly coupled to a prefuse module assembly.

FIG. 3 is a perspective view of the standard content assembly including an actuator and an extension.

FIG. 7 is an exploded perspective view of a trailer tow plug-in.

FIG. 13 is a perspective view of the prefuse module assembly including a seating tray and a device coupled to the seating tray.

FIG. 14 is another perspective exploded view of the prefuse module assembly including a cover.

FIG. 20 is a partial perspective view of the actuator initially engaging the device coupled to the seating try as the extension is initially engaging the device.

FIG. 21 is a partial perspective view of the actuator engaging the device coupled to the seating try as the extension is simultaneously engaging the device.

DETAILED DESCRIPTION OF THE INVENTION

Figure 1:
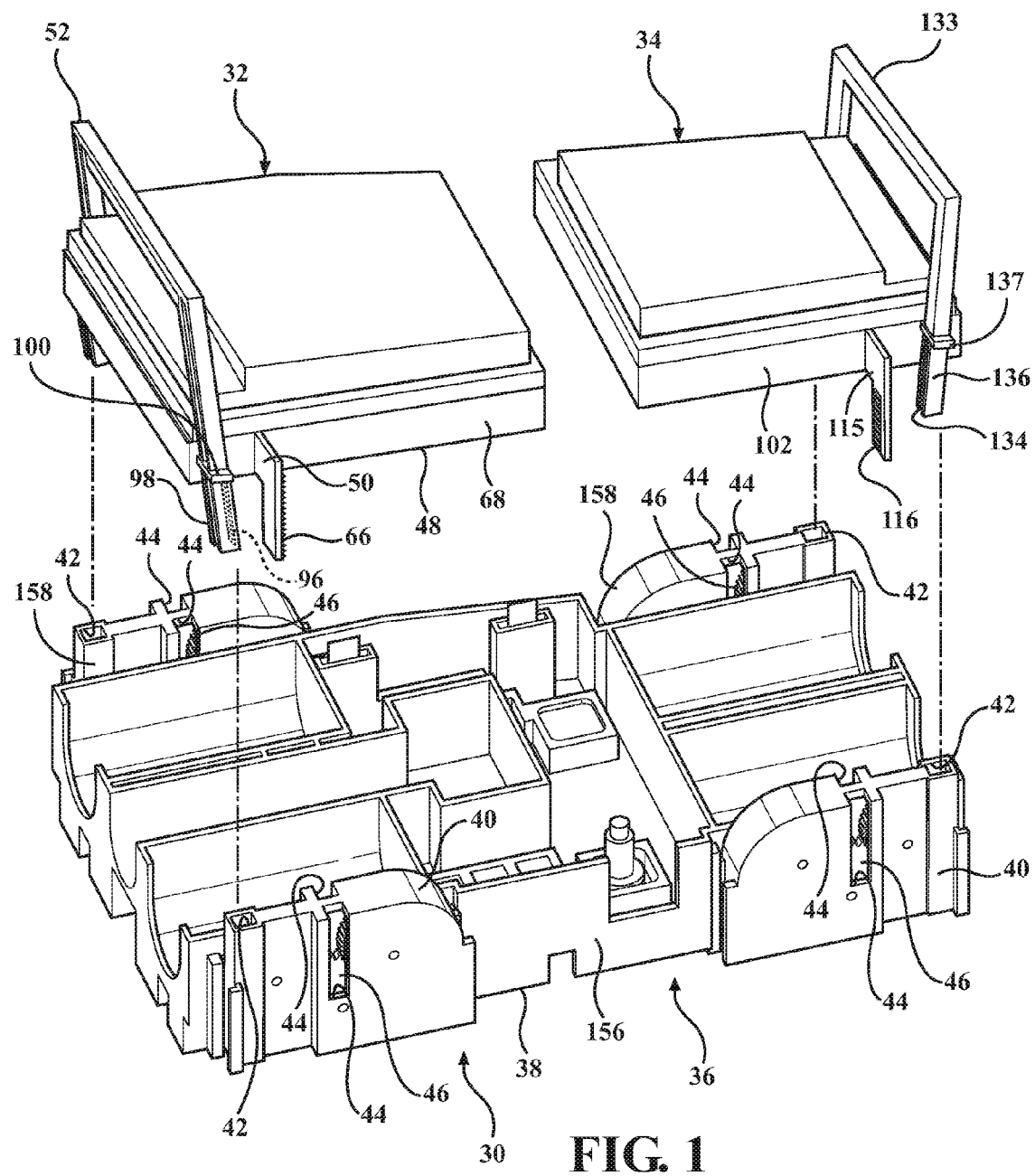
FIG. 1 is an exploded perspective view of a power distribution assembly for a vehicle.
Figure 4:
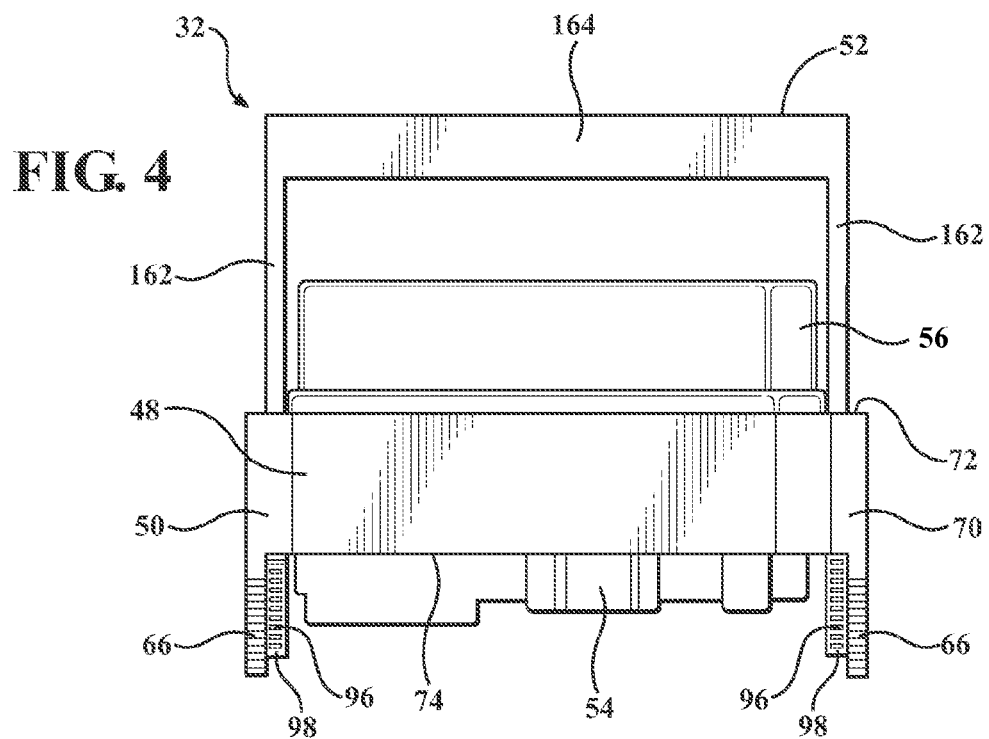
FIG. 4 is a plan view of the standard content assembly.

Referring to the Figures wherein like numerals indicate like or corresponding parts throughout the several views, a power distribution assembly 30 for a vehicle (not shown) is generally shown in FIGS. 1-2. The power distribution assembly 30 includes a standard content assembly, generally indicated at 32, an optional content assembly, generally indicated at 34, and a prefuse module assembly, generally indicated at 36, wherein the standard content assembly 32 and optional content assembly 34 are seated upon the prefuse module assembly 36. The standard content assembly 32, optional content assembly 34, and prefuse module assembly 36 will be described in further detail below.

The power distribution assembly 30 includes a seating tray 38. Specifically, the prefuse module assembly 36 includes the seating tray 38. The standard content assembly 32 and the optional content assembly 34 are seated upon the seating tray 38.

The power distribution assembly 30 includes a device 40 coupled to the seating tray 38 and at least partially fixed relative to the seating tray 38. Specifically, the prefuse module assembly 36 includes the device 40. The device 40 is used to assist an operator with seating the standard content assembly 32 and optional content assembly 34 upon the prefuse module assembly 36. Referring specifically to FIG. 1, the device 40 defines a first channel 42 and a second channel 44 spaced from the first channel 42.

The device 40 has a mechanical advantage system 46 in communication with the first and second channels 44, 46. The mechanical advantage system 46 creates a mechanical advantage to assist the operator with seating the standard content assembly 32 and optional content assembly 34 upon the prefuse module assembly 36.

The power distribution assembly 30 includes a housing 48 selectively coupled to the seating tray 38. Specifically, the standard content assembly 32 and the optional content assembly 34 both include a housing 48. The housing 48 engages the device 40 to seat the standard content assembly 32 or the optional content assembly 34 upon the prefuse module assembly 36. The housing 48 is generally rectangular in shape, but may be any suitable shape.

The power distribution assembly 30 includes an extension 50 affixed to the housing 48 and movably disposed in the second channel 44 of the device 40 engaging the mechanical advantage system 46. Specifically, the housing 48 of the standard content assembly 32 includes the extension 50. The extension 50 engages the mechanical advantage system 46 of the device 40 to seat the standard content assembly 32 upon the prefuse module assembly 36.

The power distribution assembly 30 includes an actuator 52 disposed in the first channel 42 of the device 40 engaging the mechanical advantage system 46. Specifically, the standard content assembly 32 includes the actuator 52. The actuator 52 engages the device 40 to move the extension 50 and seat the standard content assembly 32 upon the prefuse module assembly 36. As such the actuator 52 operates as a seating handle.

As shown in FIGS. 3-6, the standard content assembly 32 of the power distribution assembly 30 includes a lower housing 54 coupled to the housing 48 and a top cover assembly 56 spaced from the lower housing 54 and coupled to the housing 48. The lower housing 54 is generally rectangular in shape, but may be any suitable.

Figure 5:
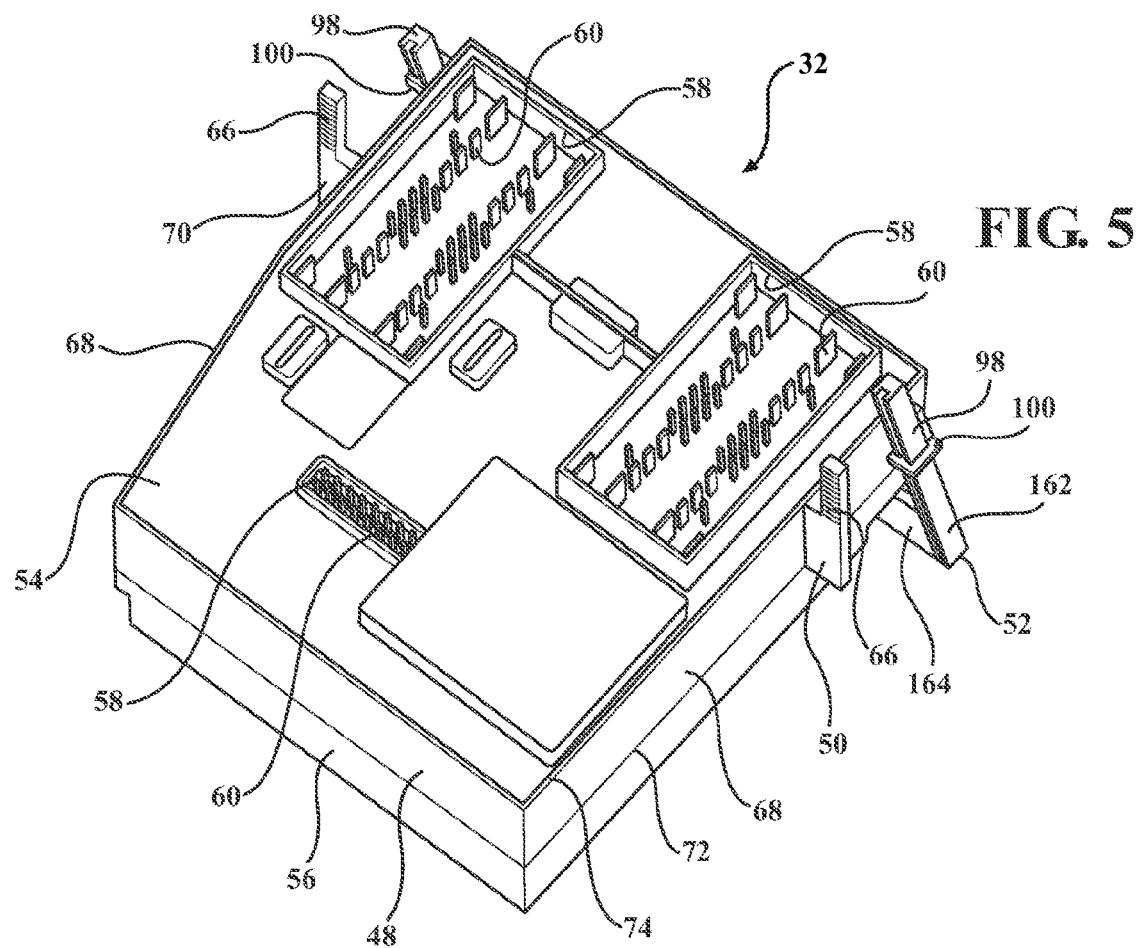
FIG. 5 is a perspective view of the standard content assembly defining one or more cavities and including pins and fuse connectors.
Figure 6:
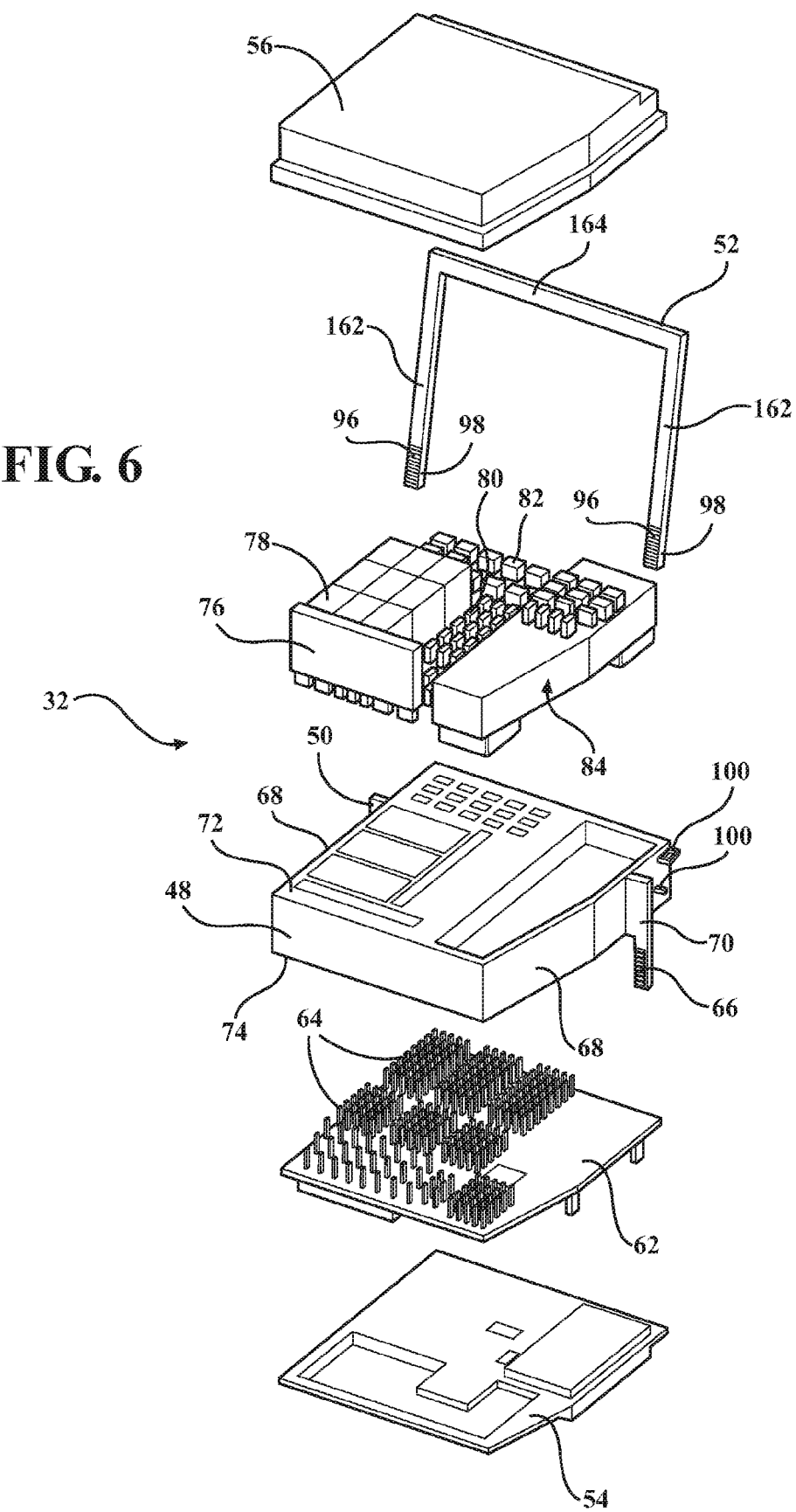
FIG. 6 is an exploded perspective view of the standard content assembly.

Referring specifically to FIG. 5, the lower housing 54 has one or more cavities 58 with pin or fuse connectors 60 on a lower side thereof. Turning to FIG. 6, the standard content assembly 32 includes a lower printed circuit board assembly 62 and one or more upper printed circuit board assembly 64. The lower and upper printed circuit board assemblies 62 and 64 mate with each other and cooperate with an upper side of the lower housing 54. It should be appreciated that the lower housing 54 and housing 48 cooperate with each other and are connected together by a suitable mechanism to enclose the lower and upper printed circuit board assemblies 62 and 64 therebetween.

As shown in FIG. 5, the extension 50 has a plurality of rack teeth 66. The extension 50 extends outwardly from a lower side thereof. The plurality of rack teeth 66 extend from the extension 50 below the lower side of the housing 48. The extension 50 is generally rectangular in shape, but may be any suitable shape. It should be appreciated there may be one or more extensions 50 as will be described below. It is to be appreciated that the plurality of rack teeth 66 may have any suitable configuration, such as extending from the extension 50 or recessed in the extension 50.

The housing 48 has a pair of housing sides 68 spaced from each other and the extension 50 is further defined as a first extension 50 affixed to one of the pair of housing sides 68 and further including a second extension 70 affixed to the other of the pair of housing sides 68. Specifically, the first and second extensions 50, 70 are integral with the pair of housing sides 68. The first and second extensions 50, 70 extend away from the pair of housing sides 68 parallel to the pair of housing sides 68.

The housing 48 has a top portion 72 and a bottom portion 74 spaced from the top portion 72 with the first and second extensions 50, 70 extending transverse from the bottom portion 74 away from the top portion 72. Specifically, the bottom portion 74 abuts the lower housing 54 and the top portion 72 abuts the top cover assembly 56.

As shown in FIG. 6, the standard content assembly 32 also includes one or more electrical fuses. In one embodiment, the fuses include a first fuse 76, one or more second fuses 78, and one or more third fuses 80. The first fuse 76 is a MUSB Multiplex type fuse, the second fuses 78 are BFSL micro type fuses, and the third fuses 80 are SBFC-M type fuses. The standard content assembly 32 includes a high current micro 280 type relay 82. The standard content assembly 32 may include a trailer tow plug-in, generally indicated at 84, to be described. The fuses 76, 78, and 80, relay 82, and trailer tow plug-in 84 cooperate with an upper side of the housing 48. It should be appreciated that the trailer tow plug-in 84 is optional and is only installed with trailer tow or when HEV content is needed.

The top cover assembly 56 is generally rectangular in shape, but may be any suitable shape. The top cover assembly 56 mates with the housing 48 to enclose the fuses 76, 78, and 80, relay 82, and trailer tow plug-in 84. The top cover assembly 56 may be a one-piece member.

Figure 7:
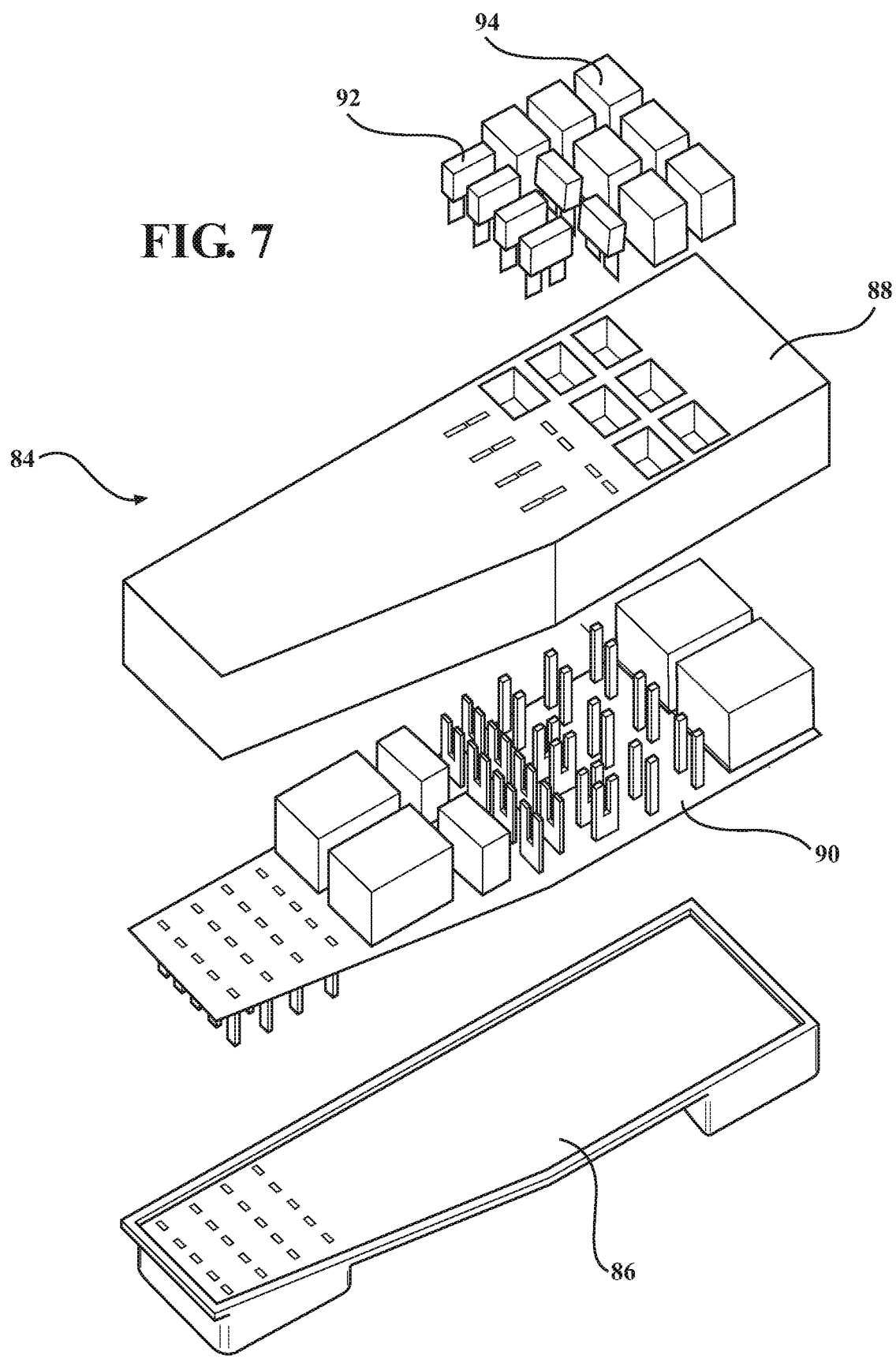

As shown in FIG. 7, the trailer tow plug-in 84 includes a lower housing 86, upper housing 88, and a printed circuit board assembly 90 disposed between the lower housing 86 and upper housing 88. The lower housing 86, upper housing 88, and printed circuit board assembly 90 have a generally rectangular and elongated shape, but may be any suitable shape. The trailer tow plug-in 84 also includes one or more electrical fuses. In this embodiment, the fuses include one or more first fuses 92 and second fuses 94. The first fuses 92 are BFSL micro type fuses and the second fuses 94 are SBFC-M type fuses. The first and second fuses 92, 94 plug into the upper housing 88 and communicate with the printed circuit board assembly 90. It should be appreciated that the lower housing 86 and upper housing 88 are connected to each other by a suitable mechanism to enclose the printed circuit board assembly 90 therebetween.

As shown in FIG. 3, the actuator 52 has a plurality of rack teeth 96. Specifically, the actuator 52 has lower ends 98 with a plurality of rack teeth 96. The plurality of rack teeth 96 are recessed in the actuator 52. The housing 48 has guides 100 with the actuator 52 extending through the guides 100 on the exterior of the housing 48. It should be appreciated that the actuator 52 has plurality of rack teeth 96 to provide a mechanical advantage to the operator when the operator presses on the handle 52 as will be described. It is to be appreciated that the plurality of rack teeth 96 may have any suitable configuration, such as extending from the actuator 52.

The actuator 52 is movably coupled to the housing 48. Specifically, the actuator 52 is movably coupled to the housing 48 of the standard content assembly 32 by the guides 100. The actuator 52 and extension 50, 70 are angled relative to each other, Specifically, the actuator 52 is movably coupled to the housing 48 at an angle relative to the extension 50, 70.

Figure 8:
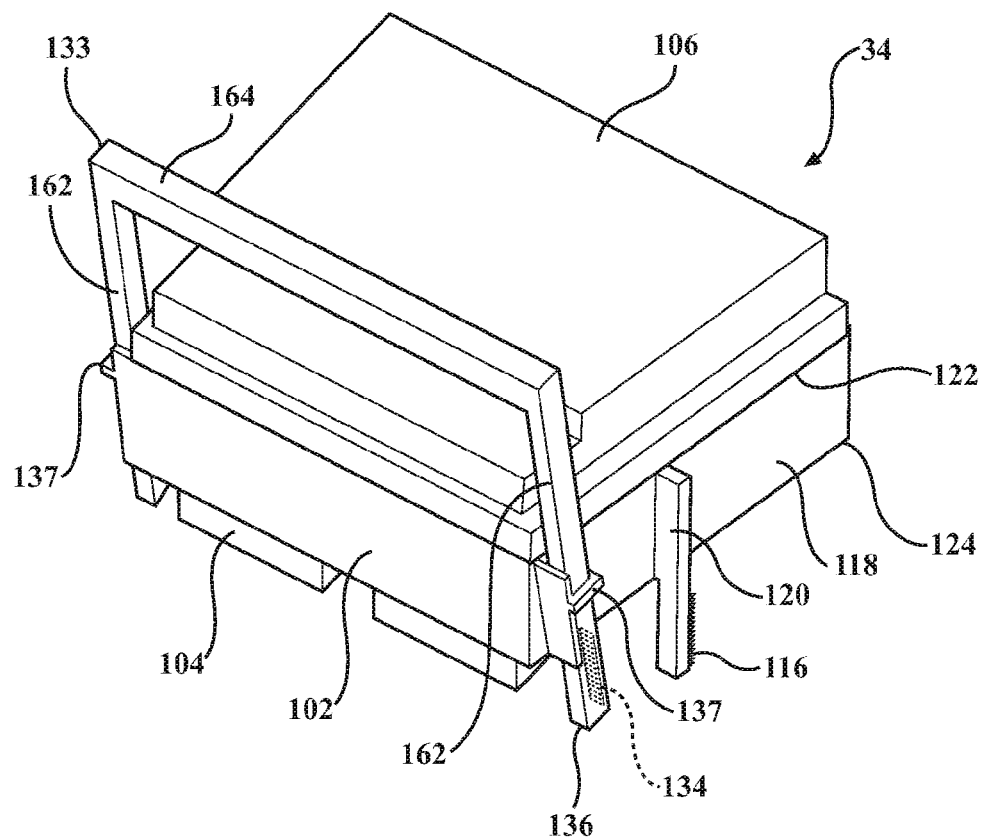
FIG. 8 is a perspective view of the optional content assembly.
Figure 9:
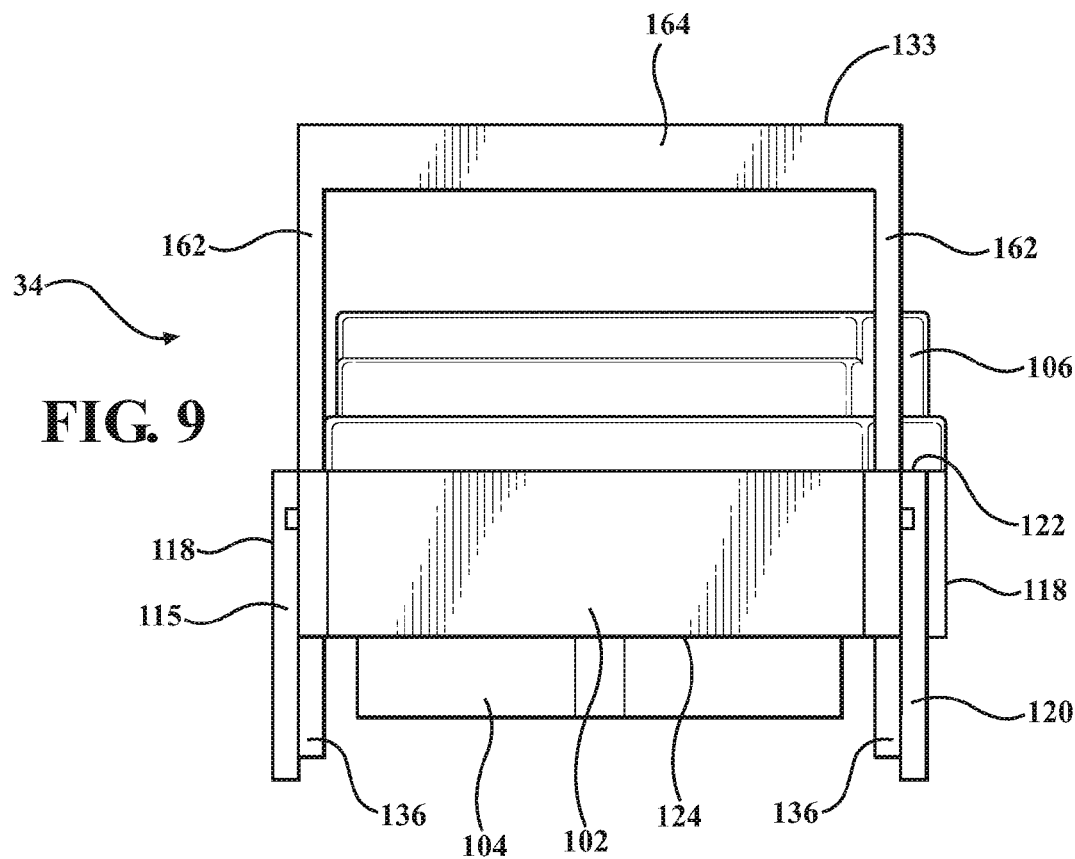
FIG. 9 is a plan view of the optional content assembly.
Figure 10:
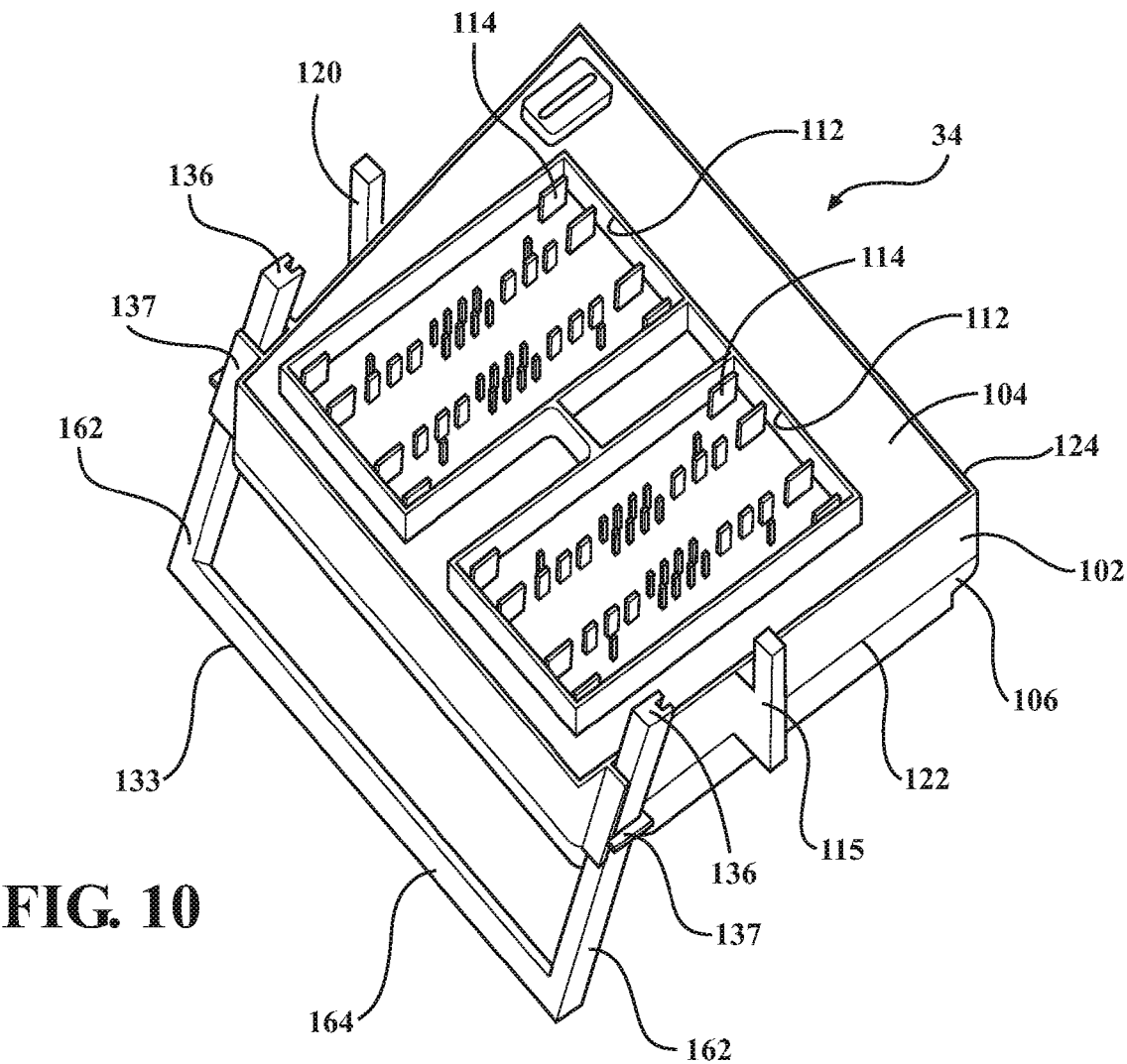
FIG. 10 is a perspective view of the optional content assembly defining one or more cavities and including pins and fuse connectors.

As shown in FIGS. 1-2, the housing 48 is further defined as a first housing 48 and further includes a second housing 102 selectively coupled to the seating tray 38. Specifically, the standard content assembly 32 includes the first housing 48 and the optional content assembly 34 includes the second housing 102. As shown in FIG. 8-10, the optional content assembly 34 of the power distribution assembly 30 includes a lower housing 104 coupled to the second housing 102 and a top cover assembly 106 spaced from the lower housing 104 and coupled to the second housing 102.

Figure 11:
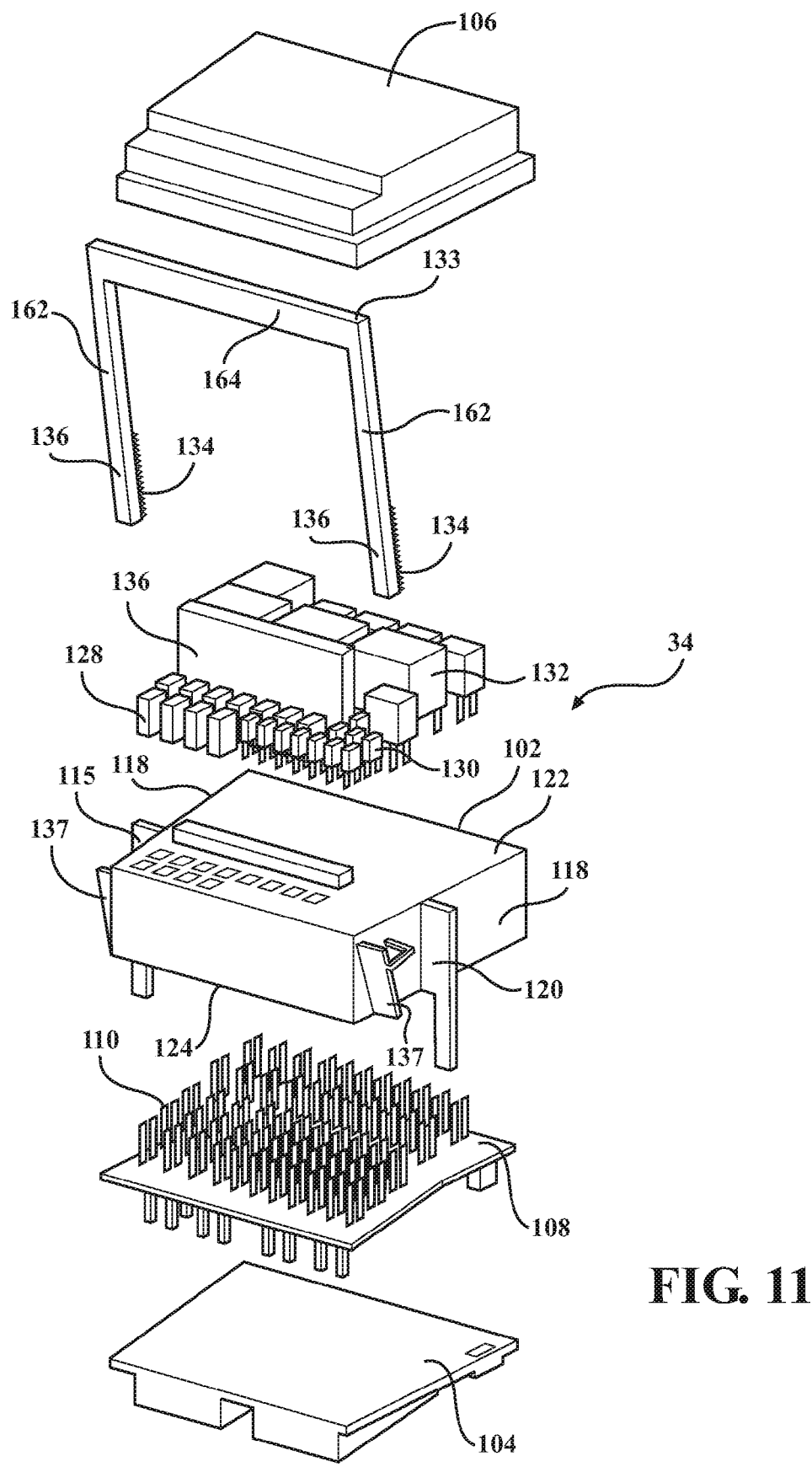
FIG. 11 is an exploded perspective view of the optional content assembly.

As shown in FIG. 11, the optional content assembly 34 includes a lower printed circuit board assembly 108 and one or more upper printed circuit board assembly 110. The lower housing 104 is generally rectangular in shape, but may be any suitable shape. The lower housing 104 has one or more cavities 112 with pin or fuse connectors 114 on a lower side thereof. The printed circuit board assemblies 108 and 110 mate with each other and cooperate with an upper side of the lower housing 104. It should be appreciated that the lower housing 104 and second housing 102 cooperate with each other and are connected together by a suitable mechanism to enclose the printed circuit board assemblies 108 and 110 therebetween.

The second housing 102 of the optional content assembly 34 includes an extension 115. The extension 115 is generally rectangular in shape, but may be any suitable shape. The extension 115 has a plurality of rack teeth 116. The extension 115 extends outwardly from a lower side thereof. It is to be appreciated that the plurality of rack teeth 116 may have any suitable configuration, such as extending from the extension 115 or recessed in the extension 115.

The second housing 102 has a pair of housing sides 118 spaced from each other and the extension 115 is further defined as a first extension 115 affixed to one of the pair of housing sides 118 and further including a second extension 120 affixed to the other of the pair of housing sides 118. Specifically, the first and second extensions 115, 120 are integral with the pair of housing sides 118. The first and second extensions 115, 120 extend away from the pair of housing sides 118 parallel to the pair of housing sides 118.

The second housing 102 has a top portion 122 and a bottom portion 124 spaced from the top portion 122 with the first and second extensions 115, 120 extending transverse from the bottom portion 124 away from the top portion 122. Specifically, the bottom portion 124 abuts the lower housing 102 and the top portion 122 abuts the top cover assembly 106.

The optional content assembly 34 also includes one or more electrical fuses. In one embodiment, the fuses include a first fuse 126, one or more second fuse 128, and one or more third fuses 130. The first fuse 126 is a MUSB Multiplex type fuse, the second fuses 128 are BFSL micro type fuses, and the third fuses 130 are SBFC-M type fuses. The optional content assembly 34 includes a high current micro 280 type relay 132. The fuses 126, 128, and 130, and relay 132 cooperate with an upper side of the second housing 102.

The top cover assembly 106 is generally rectangular in shape, but may be any suitable shape. The top cover assembly 106 may be a one-piece member. The top cover assembly 106 mates and cooperates with an upper side of the second housing 102 to enclose the fuses 126, 128, and 130, and relay 132.

As shown in FIGS. 1-2, the actuator 52 is further defined as a plurality of actuators 52, 133 spaced from each other and the extension 50 is further defined as a plurality of extensions 50, 70, 115, 120 equal in number to the plurality of actuators 52, 133. Each one of the plurality of actuators 52, 133 is movably coupled to the housings 48, 102 relative to one of the plurality of extensions 50, 70, 115, 120. The actuator 133 and extension 115, 120 are angled relative to each other, Specifically, the actuator 133 is movably coupled to the housing 102 at an angle relative to the extension 115, 120.

The actuator 133 has a plurality of rack teeth 134. Specifically, the actuator 133 has lower ends 136 with a plurality of rack teeth 134. The plurality of rack teeth 134 are recessed in the actuator 133. The second housing 102 has guides 137 with the actuator 52 extending through guides 137 on the exterior of the second housing 102. It should be appreciated that the actuator 133 has the plurality of rack teeth 134 to provide a mechanical advantage to the operator when the operator presses on the actuator 133 as will be described. It is to be appreciated that the plurality of rack teeth 134 may have any suitable configuration, such as extending from the actuator 133.

The actuator 133 is movably coupled to the second housing 102. Specifically, the actuator 133 is movably coupled to the housing of the optional content assembly 34 by the guides 137.

Figure 12:
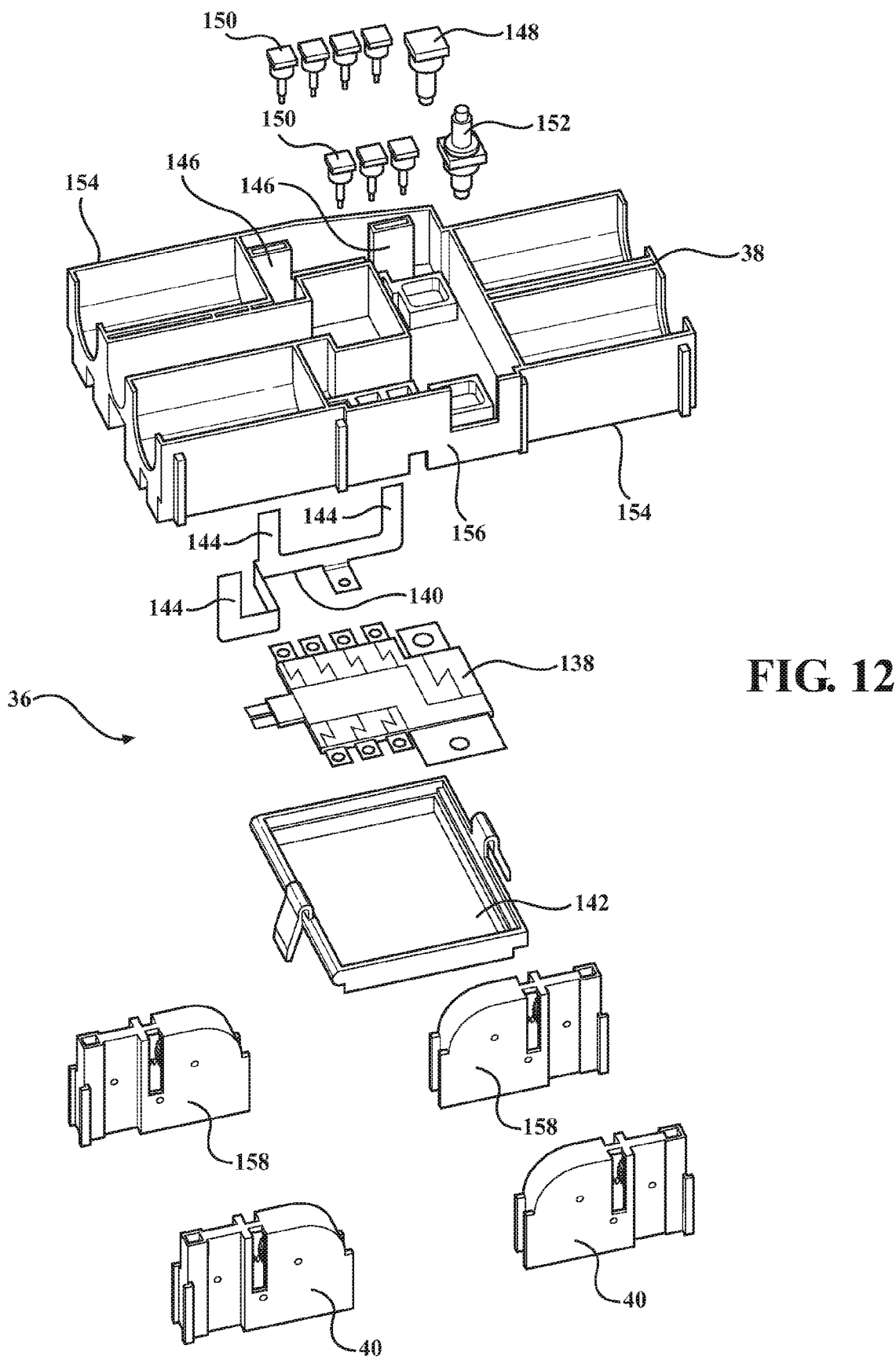
FIG. 12 is an exploded perspective view of the prefuse module assembly.

As shown in FIG. 12, the prefuse module assembly 36 includes a master fuse 138, a buss bar 140, and a cover 142. The seating tray 38 is generally rectangular in shape, but may be any suitable shape. The buss bar 140 has upwardly extending electrical blades 144 that extend through sleeves 146 in the seating tray 38 and the master fuse 138 is disposed adjacent the buss bar 140 in the seating tray 38. The cover 142 cooperates with a lower side of the seating tray 38 to enclose the master fuse 138 and buss bar 140 therebetween. It should be appreciated that the cover 142 is removable from the seating tray 38.

The prefuse module assembly 36 also includes a plurality of fasteners to attach to the master fuse 138. The fasteners include a first fastener 148 of a M8 Stud type, a plurality of second fasteners 150 of a M5 Stud type, and a pass through stud 152. The fasteners 148, 150, and 152 are disposed on an upper side of the seating tray 38 and extend through the seating tray 38 to threadably engage the master fuse 138 and/or buss bar 140. It should be appreciated that the fasteners 148, 150, and 152 are conventional and known in the art As shown in FIGS. 12-14, the device 4U is further defined as a plurality of devices 40 equal in number to the plurality of actuators 52 with the plurality of devices 40 spaced from each other to distribute the movement translated from the plurality of actuators 52. Specifically, the pre-fuse module assembly 36 includes a device 40 for each one of the lower ends 98, 136 of the plurality of actuators 52, 133. In the embodiment illustrated, there are four (4) devices 40, or gear assemblies, one at each corner of the seating tray 38

The seating tray 38 has a pair of tray sides 154 spaced from each other. Additionally, the pair of tray sides 154 are parallel with each other. Further, the pair of tray sides 154 are aligned with the pair of housing sides 68, 118 of the first and second housings 48, 102. In the embodiment illustrated, two of the devices 40 are coupled to one of the pair of tray sides 154 and the other two of the devices 40 are coupled to an other of the pair of tray sides 154.

The seating tray 38 has an exterior surface 156 with the device 40 coupled to the exterior surface 156. Specifically, the seating tray 38 has a pair of exterior surfaces 156 with one of the pair of exterior surfaces 156 extends along one of the pair of trays sides 154 and an other of the pair of exterior surfaces 156 extends along the other of the pair of trays sides 154. The devices 40 are coupled to the pair of exterior surfaces 156.

The device 40 is further defined as a first device 40 affixed to one of the pair of tray sides 154 and further including a second device 158 affixed to an other of the pair of tray sides 154 with the first extension 50 disposed in the second channel 44 of the first device 40 and the second extension 70 disposed in a second channel 44 of the second device 158. In the embodiment illustrated, there is a first and second device 40, 158 for each of the standard content assembly 32 and optional content assembly 34. The first extension 115 of the optional content assembly 34 is disposed in the second channel 44 of the first device 40 and the second extension 120 of the optional content assembly 34 is disposed in a second channel 44 of the second device 158.

Figure 15:
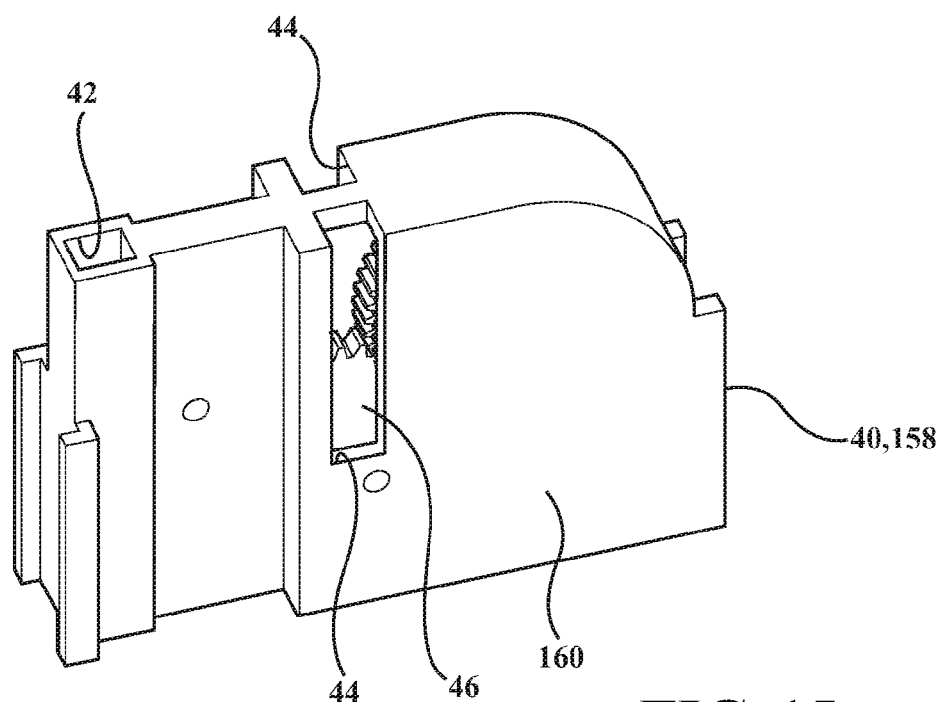
FIG. 15 is a perspective view of the device defining a first channel and a pair of second channels.
Figure 16:
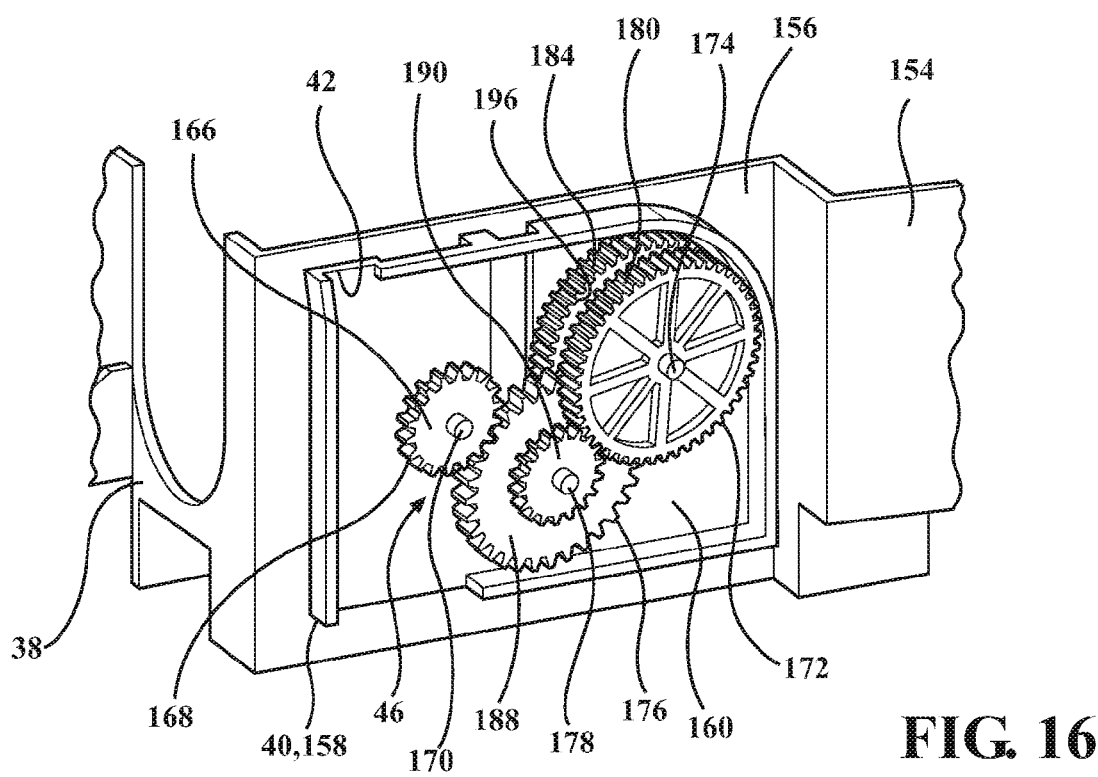
FIG. 16 is a perspective cross-sectional view of the device including an actuator gear, an intermediate gear, and an extension gear.

As shown in FIG. 15-16, each of the first and second devices 40, 158 includes a housing 160. The housing 160 defines the first channel 42 to receive the lower ends 98, 136 of one of the actuators 52, 133. The housing 160 defines the second channel 44 spaced from the first channel 42 to receive one of the extensions 50, 70, 115, 120. Specifically, the second channel 44 is defined as a pair of second channels 44. The mechanical advantage system 46 is disposed in the housing 160 and is in communication with the first and second channels 42, 44.

As shown in FIG. 2, the actuator 52, 133 has a u-shaped configuration with a pair of legs 162 spaced from each other with one of the pair of legs 162 disposed in the first channel 42 of the first device 40 and an other of the pair of legs 162 disposed in a first channel 42 of the second device 158 to distribute movement of the actuator 52, 133. The actuator 52 has a base 164 extending between the pair of legs 162. The operator uses the base 164 to move the pair of legs 162 simultaneously to engage the first and second devices 40, 158 simultaneously.

Figure 17:
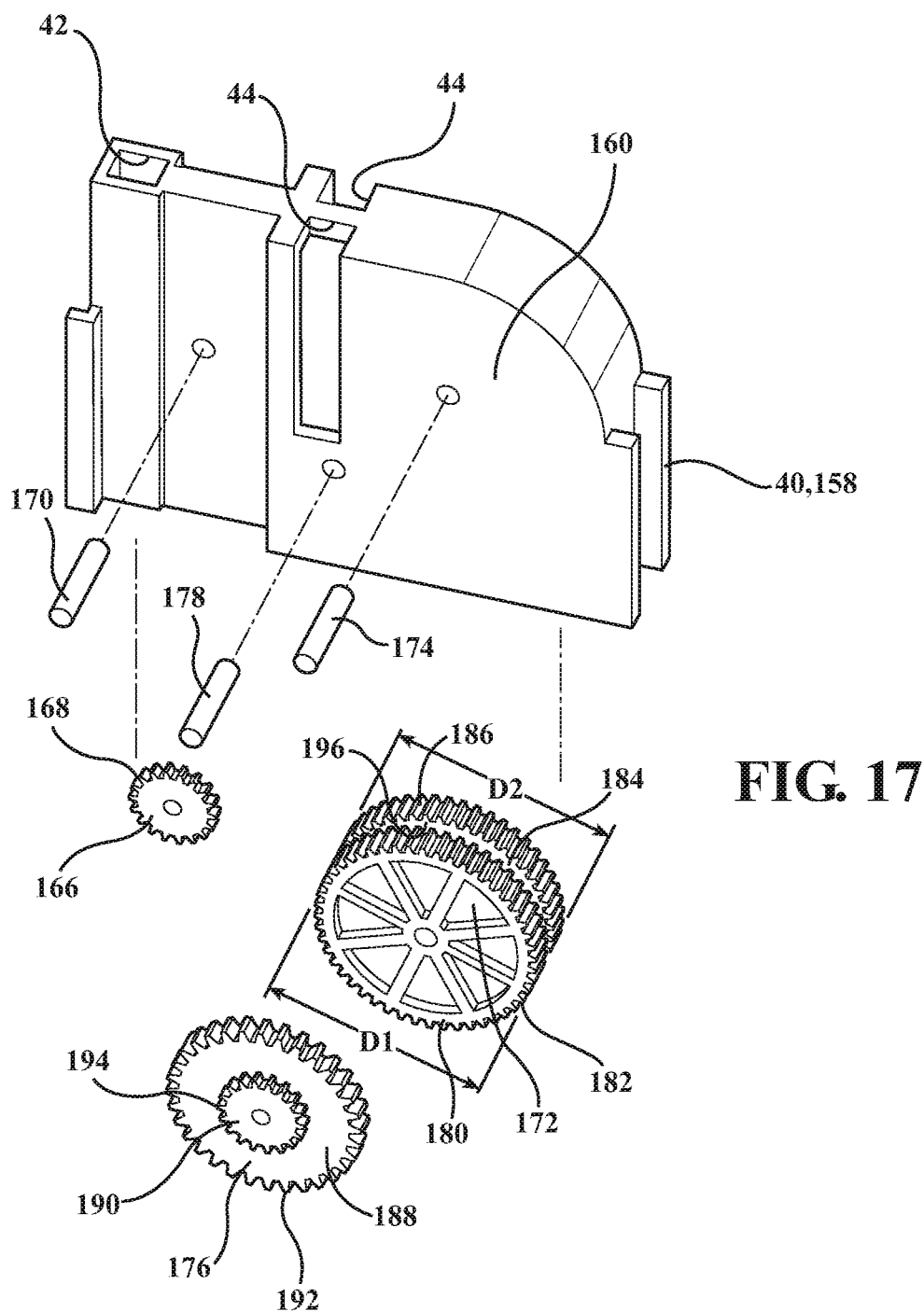
FIG. 17 is an exploded perspective view of the device including the actuator gear, intermediate gear, and extension gear.

As shown in FIG. 16-17, the mechanical advantage system 46 is further defined as a gear arrangement for creating a mechanical advantage between the actuator 52, 133 and the extension 50, 70, 115, 120. The gear arrangement is further defined as a gear train including a plurality of gears. The plurality of gears translate movement of the actuator 52, 133 in the first channel 42 to move the extension 50, 70, 115, 120 in the second channel 44.

The gear arrangement is includes an odd number of gears. In the embodiment illustrated, there are five gears in the gear arrangement such that outermost gears of the gear arrangement rotate in the same direction. It should be appreciated that the gear arrangement may have any number of gears.

The devices 40, 158 cooperate with the plurality of rack teeth 96, 134 on the actuators 52, 133, respectively, and the plurality of rack teeth 66, 116 on the first and second extensions 50, 70, 115, 120, respectively, to allow the standard content assembly 32 and optional content assembly 34 to raise and lower relative to the prefuse module assembly 36. The gear arrangement is at least partially disposed between the extension 50, 70, 115, 120 and the actuator 52, 133.

The gear arrangement includes an actuator gear 166 in communication with the first channel 42 for engaging the actuator 52. Specifically, each device 40 also includes an actuator gear 166 having a plurality of teeth 168. The actuator gear 166 is disposed within and rotatably connected to the housing 160 by a suitable mechanism such as a pin 170. The actuator gear 166 communicates with the first channel 42.

The gear arrangement includes an extension gear 172 in communication with the second channel 44 for engaging the extension 50, 70, 115, 120. The extension gear 172 is disposed within and rotatably connected to the housing 160 by a suitable mechanism such as a pin 174. The extension gear 172 is spaced from the actuator gear 166.

The gear arrangement includes an intermediate gear 176 disposed between the actuator gear 166 and the extension gear 172 such that the actuator and extension gears 166, 172 rotate in the same direction. The intermediate gear 176 is disposed within and rotatably connected to the housing 160 by a suitable mechanism such as a pin 178. It should be appreciated that the actuator gear 166 rotates the intermediate gear 176 when one of the actuators 52, 133 is moved up or down by the operator. It should be appreciated that the intermediate gear 176 rotates the extension gear 172 cooperating with the plurality of rack teeth 66, 116 to move the standard content assembly 32 and optional content assembly 34, respectively.

The extension gear 172 includes an input gear 180 and an output gear 182 coupled to each other to rotate in unison. The input gear 180 has a plurality of teeth 184 cooperating with the intermediate gear 176 and the output gear 182 has a plurality of teeth 186 cooperating with the intermediate gear 176. The plurality of teeth 184, 186 of the input and output gears 180, 182 are in communication with the second channel 44 and cooperating with the extension 50, 70, 115, 120. The extensions 50, 70, 115, 120 can be placed in either of the second channels 44 and engage either of the input and output gears 180, 182 of the extension gear 172.

As shown in FIG. 17, the input gear 180 has an input diameter D1 and the output gear 182 has an output diameter D2 equal to the input diameter D1. The equal input and output diameters D1, D2 rotate the same distance such that the extension 50, 70, 115, 120 will be moved at the same rate and the same distance in the either of the second channels 44.

The intermediate gear 176 is further defined as a compound gear including a first gear 188 engaging the actuator gear 166 and a second gear 190 engaging the extension gear 172. The first gear 188 has a plurality of teeth 192 cooperating with the actuator gear 166. The second gear 190 has a plurality of teeth 194 disposed axially adjacent the first gear 188.

The intermediate gear 176 further includes a third gear (not shown) coupled to the second gear opposite of the first gear 188. The third gear has a diameter equal to a diameter of the first gear 188 and a plurality of teeth (not shown) equal to the plurality of teeth 192 of the first gear 188.

The input gear 180 engages the second gear 190 of the intermediate gear 176 and is in communication with the second channel 44 and engaging the extension 50. In the embodiment shown, the plurality of teeth 184 of the input gear 180 cooperates with the plurality of teeth 194 of the second gear 190. The plurality of teeth 184 of the input gear 180 also cooperates with the plurality of rack teeth 66, 116 of the extension 50, 70, 115, 120.

Although not specifically shown in the Figures, the plurality of teeth of the third gear cooperates with the plurality of teeth 186 of the output gear 182. The extension 50, 70, 115, 120 can be placed on either of second channels and engage either the input gear or output gear and move the same distance.

The extension gear 172 defines a void 196 between the input and output gears 180, 184 with the first gear 188 of the intermediate gear 176 movably disposed is the void 196. Specifically, the input and output gears 180, 184 are spaced from each other along the pin 174. The first gear 188 of the intermediate gear 176 rotates about the pin 178 between the input and output gears 180, 184 of the extension gear 172.

Figure 18:
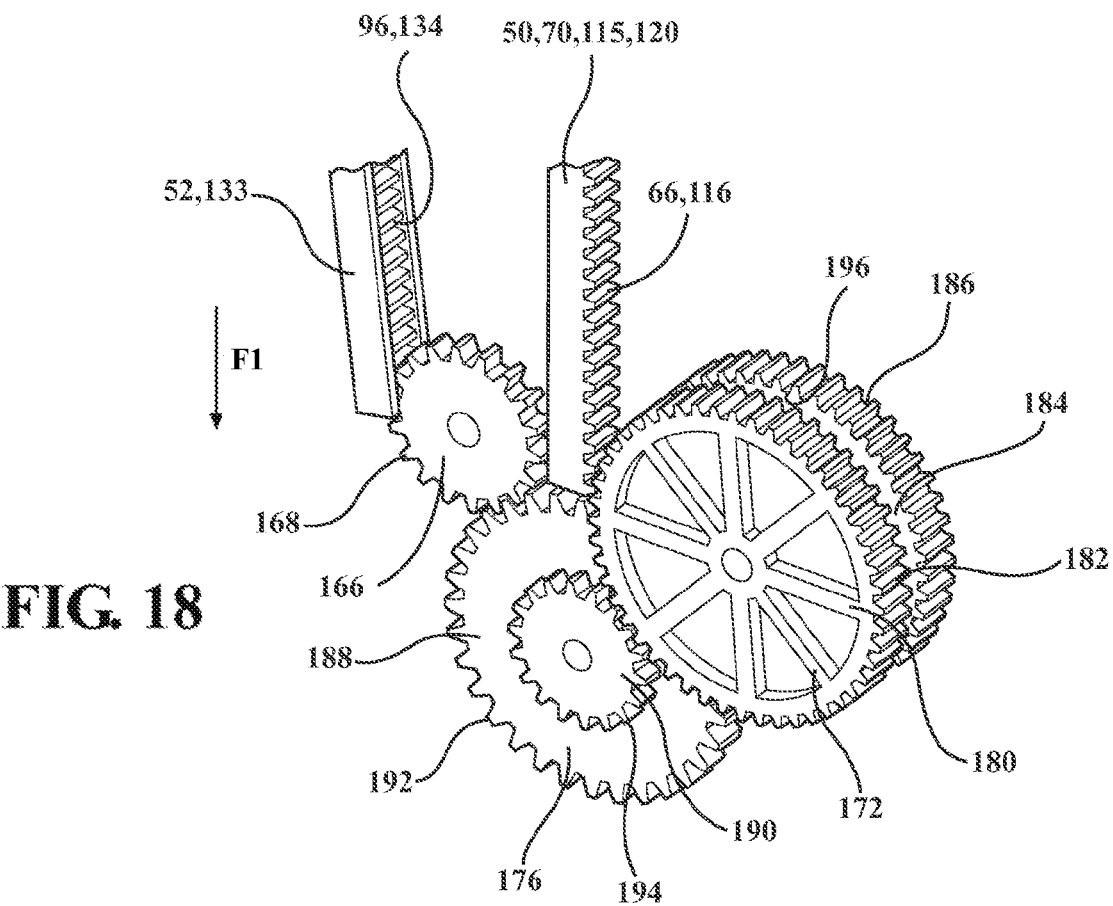
FIG. 18 is a partial perspective view of the actuator initially engaging the actuator gear as the extension is initially engaging the extension gear.
Figure 19:
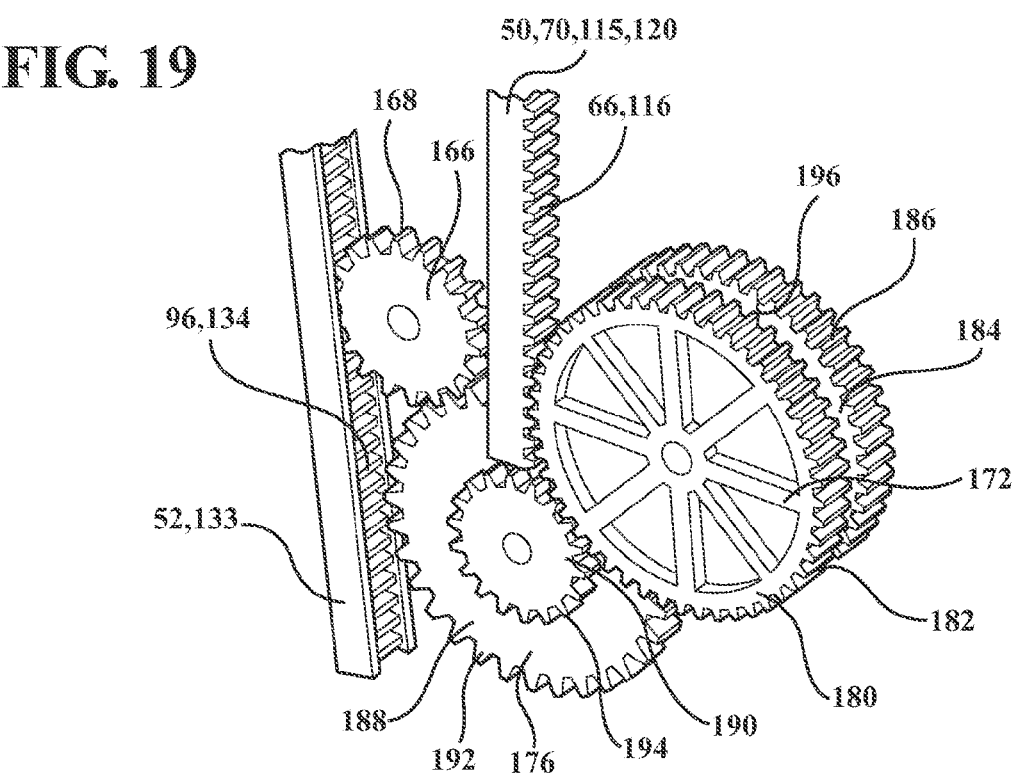
FIG. 19 is a partial perspective view of the actuator engaging the actuator gear as the extension is simultaneously engaging the extension gear.

As shown FIGS. 18-19, the actuator 52, 133 has a plurality of rack teeth 96, 134 for engaging the gear arrangement in the first channel 42. Specifically, the plurality of rack teeth 96, 134 of the actuator 52, 133 are disposed in the first channel 42 and engage the actuator gear 166. Movement of the plurality of rack teeth 96, 134 of the actuator 52, 133 in the first channel 42 rotates the actuator gear 166 in the housing 160.

The extension 50, 70, 115, 120 has a plurality of rack teeth 66, 116 for engaging the gear arrangement in the second channel 44. The plurality of rack teeth 96, 134 of the actuator 52, 133 faces the actuator gear 166 and the plurality of rack teeth 66, 116 of the extension 50, 70, 115, 120 faces the extension gear 172 with both of said plurality of rack teeth 66, 96, 116, 134 of the actuator 52, 133 and the extension 50, 70, 115, 120 facing the same direction. Specifically, the plurality of rack teeth 66, 116 of the extension 50, 70, 115, 120 are disposed in the second channel 44 and engage the extension gear 172. In the embodiment shown, movement of the plurality of rack teeth 66, 116 of extension 50, 70, 115, 120 in the second channel 44 rotates the input gear 180 of the device 40, 158. It is to be appreciated that movement of the plurality of rack teeth 66, 116 of extension 50, 70, 115, 120 in the second channel 44 may rotate the extension gear 172 in the housing 160.

The extension 50, 70, 115, 120 engages the mechanical advantage system 46 simultaneously as the actuator 52, 133 engages the mechanical advantage system 46. The plurality of rack teeth 66, 116 of the extension 50, 70, 115, 120 engages or disengages the plurality of teeth 182 of input gear 180 of the extension gear 172 simultaneously as the plurality of rack teeth 96, 134 of the actuator 52, 133 engages or disengages the plurality of teeth 168 of the actuator gear 166. It is to be appreciated that the plurality of rack teeth 66, 116 of the extension 50, 70, 115, 120 may engage or disengage the plurality of teeth 186 of output gear 184 of the extension gear 172 simultaneously as the plurality of rack teeth 96, 134 of the actuator 52, 133 engages or disengages the plurality of teeth 168 of the actuator gear 166.

The actuator 52, 133 is movable in a first direction F1 to actuate the mechanical advantage system 46 and translate movement of the actuator 52, 133 to movement of the extension 50, 70, 115, 120 with the first and second housings 48, 102 moving toward the seating tray 38 during the movement of the extension 50, 70, 115, 120. The actuator gear 166 rotates the first gear 188 of the intermediate gear 176 when the actuator 52, 133 is moved in the first direction F1 by the operator. The second gear 190 of the intermediate gear 176 rotates the input gear 180 of the extension gear 172. The input gear 180 of the extension gear 172 cooperates with the plurality of rack teeth 66, 116 of the extension 50, 70, 115, 120 to move the standard content assembly 32 or optional content assembly 34, respectively towards the seating tray 38. It is to be appreciated that the output gear 184 of the extension gear 172 cooperates with the plurality of rack teeth 66, 116 of the extension 50, 70, 115, 120 to move the standard content assembly 32 or optional content assembly 34, respectively towards the seating tray 38.

The actuator 52, 133 is movable in a second direction F2 opposite of the first direction F1 to actuate the mechanical advantage system 46 and translate movement of the actuator 52, 133 to movement of the extension 50, 70, 115, 120 with the first and second housing 48, 102 moving away from the seating tray 38 during the movement of the extension 50, 70, 115, 120. The actuator gear 166 rotates the first gear 188 of the intermediate gear 176 when one of the actuators 52, 133 is moved in the second direction F2 by the operator. The second gear 190 of the intermediate gear 176 rotates the input gear 180 of the extension gear 172. The input gear 180 cooperates with the plurality of rack teeth 66, 116 of the extension 50, 70, 115, 120 to move the standard content assembly 32 and optional content assembly 34, respectively away the seating tray 38. It is to be appreciated that the output gear 184 may cooperates with the plurality of rack teeth 66, 116 of the extension 50, 70, 115, 120 to move the standard content assembly 32 and optional content assembly 34, respectively away the seating tray 38.

The mechanical advantage system 46 translates movement of the actuator 52, 133 in the first direction F1 to the extension 50, 70, 115, 120 such that the extension 50, 70, 115, 120 and first and second housings 48, 102 move in the first direction F1. Specifically, the mechanical advantage system 46 translates movement of the actuator 52, 133 in the first direction F1 to the extension 50, 70, 115, 120 to move the standard content assembly 32 or optional content assembly 34 in the first direction F1 to couple the standard content assembly 32 or optional content assembly 34 to the prefuse module assembly 36.

The mechanical advantage system 46 translates movement of the actuator 52, 133 in a second direction F2 to the extension 50, 70, 115, 120 such that the extension 50, 70, 115, 120 and first and second housings 48, 102 move in the second direction F2. Specifically, the mechanical advantage system 46 translates movement of the actuator 52, 133 in the second direction F2 to the extension 50, 70, 115, 120 to move the standard content assembly 32 or optional content assembly 34 in the second direction F2 to uncouple the standard content assembly 32 or optional content assembly 34 from the prefuse module assembly 36

It should also be appreciated that the actuator, intermediate, and extension gears 166, 172, 176 form a gear train having gear ratios to provide a "three-to-one" to "nine-to-one" mechanical advantage to the operator when the operator presses on the actuators 52, 133 of the standard content assembly 32 and optional content assembly 34, respectively. It should further be appreciated that the actuator, intermediate, and extension gears 166, 172, 176 have gear ratios that provide a greater than "one-to-one" mechanical advantage with a "nine-to-one" mechanical advantage being preferred.

Figure 22:
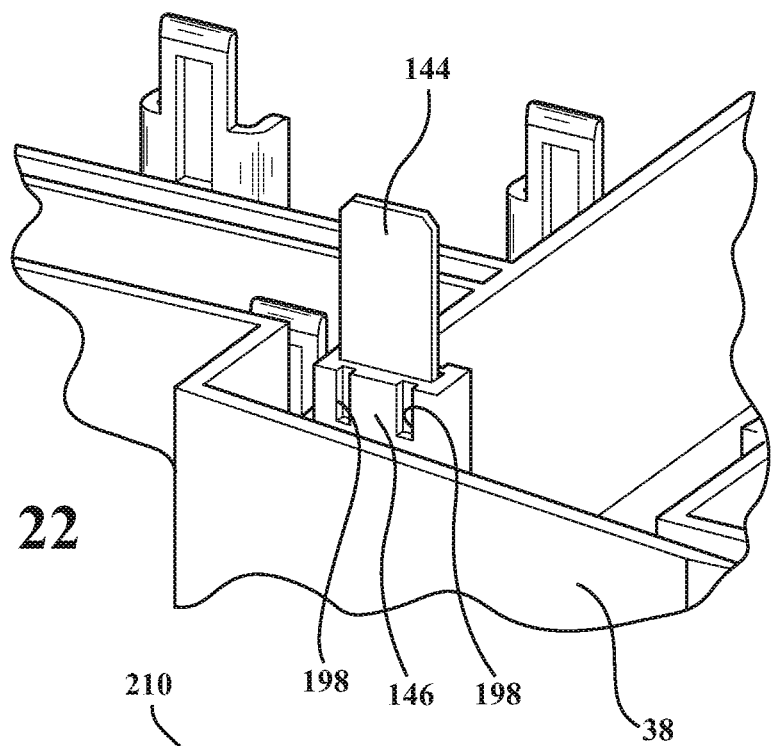
FIG. 22 is a partial perspective view of the seating tray including an electrical blade and a sleeve with the electrical blade extending from the sleeve.
Figure 23:
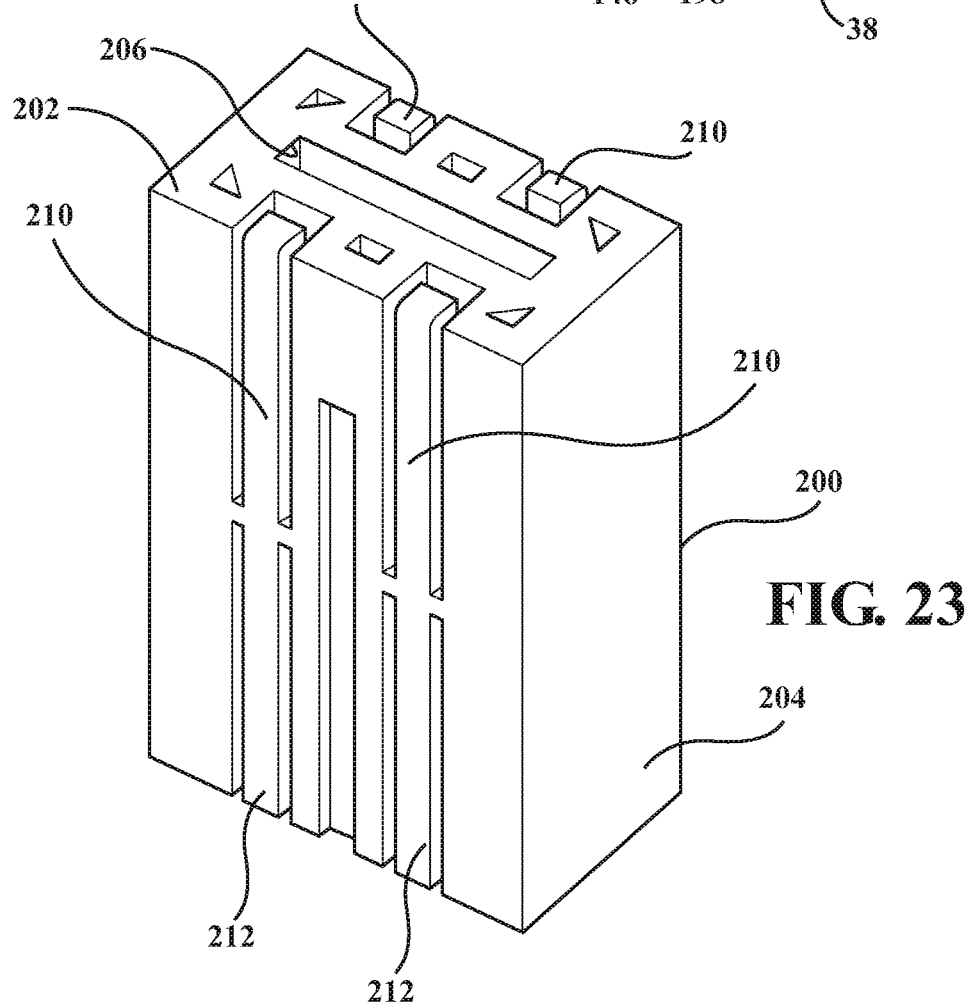
FIG. 23 is a perspective view of the protective cover.
Figure 24:
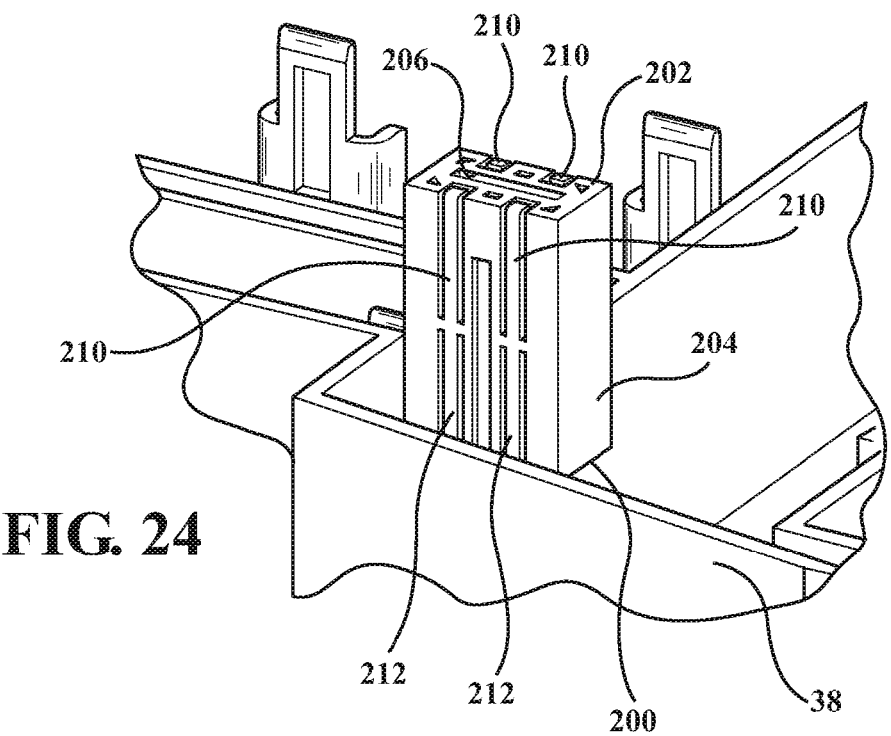
FIG. 24 a partial perspective view of a protective cover disposed over the electrical blade.

As shown in FIG. 22, the one or more of sleeves 146 and one or more of the electrical blades 144 extending through the one or more of sleeves 146 on the seating tray 38. The sleeves 146 define recesses 198. Turning to FIGS. 23-24, the power distribution assembly 30 may include one or more protective cover 200 that goes over the one or more of the electrical blades 144. The protective cover 200 is generally rectangular in shape, but may be any suitable shape to mate with the sleeves 146. The protective cover 200 has a top wall 202 and side walls 204 extending from the top wall 202 to fit over a top of the sleeve 146. The protective cover 200 also has a slot 206 extending therethrough to allow the electrical blade 144 to extend therethrough. The protective cover 200 cooperates with the lower housing 104 to automatically move to an up position when the optional content assembly 34 is absent. The protective cover 200 automatically moves down to expose the blade 144 when the optional content assembly 34 is present.

Figure 25:
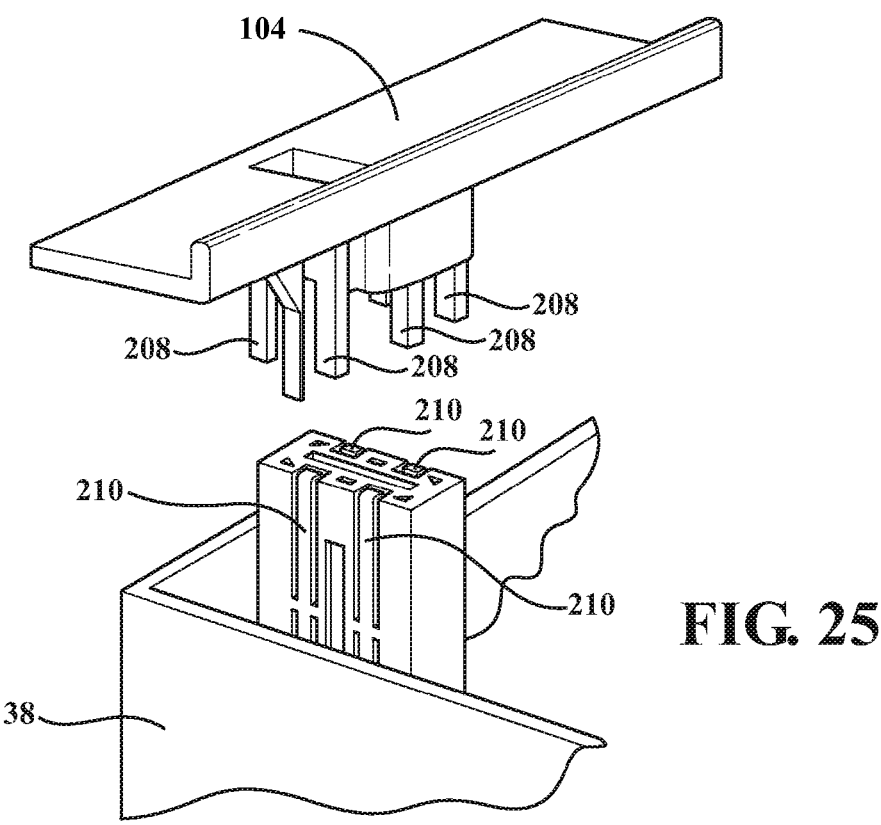
FIG. 25 is a partial perspective view of the housing having tabs and the protective cover having latches.
Figure 26:
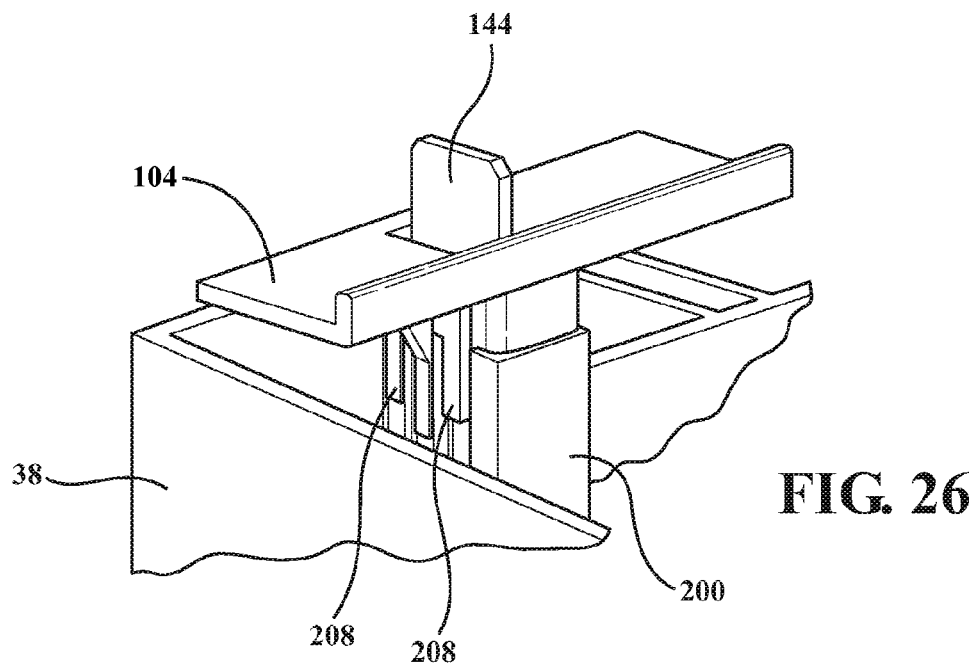
FIG. 26 is a partial perspective view of the tabs of the housing engaging the latches of the protective cover.

As shown in FIGS. 25-26, the lower housing 104 may include tabs 208 and the protective cover include upper latches 210 with the tabs 208 engaging the upper latches 210 on an upper portion of the protective cover 200 to allow the protective cover 200 to slide down during mating operation and allow the protective cover 200 to slide back into a protective position when the optional content assembly 34 is unmated from the seating tray 38. Turning back to FIG. 23, the protective cover 200 may include lower latches 212 on a lower portion thereof to engage and disengage corresponding recesses 198 on the sleeves 146. It should be appreciated that the protective cover 200 allows the lower housing 104 to release and pull the protective cover 200 back into place during the seating/unseating of the optional content assembly 34 to the seating tray 38. It should also be appreciated that the electrical blade 144 may be exposed during service of the power distribution assembly 30. It should further be appreciated that the tabs 208 could also be added to the lower housing 54 of the standard content assembly 32 to cooperate with the protective covers 200.

Figure 27:
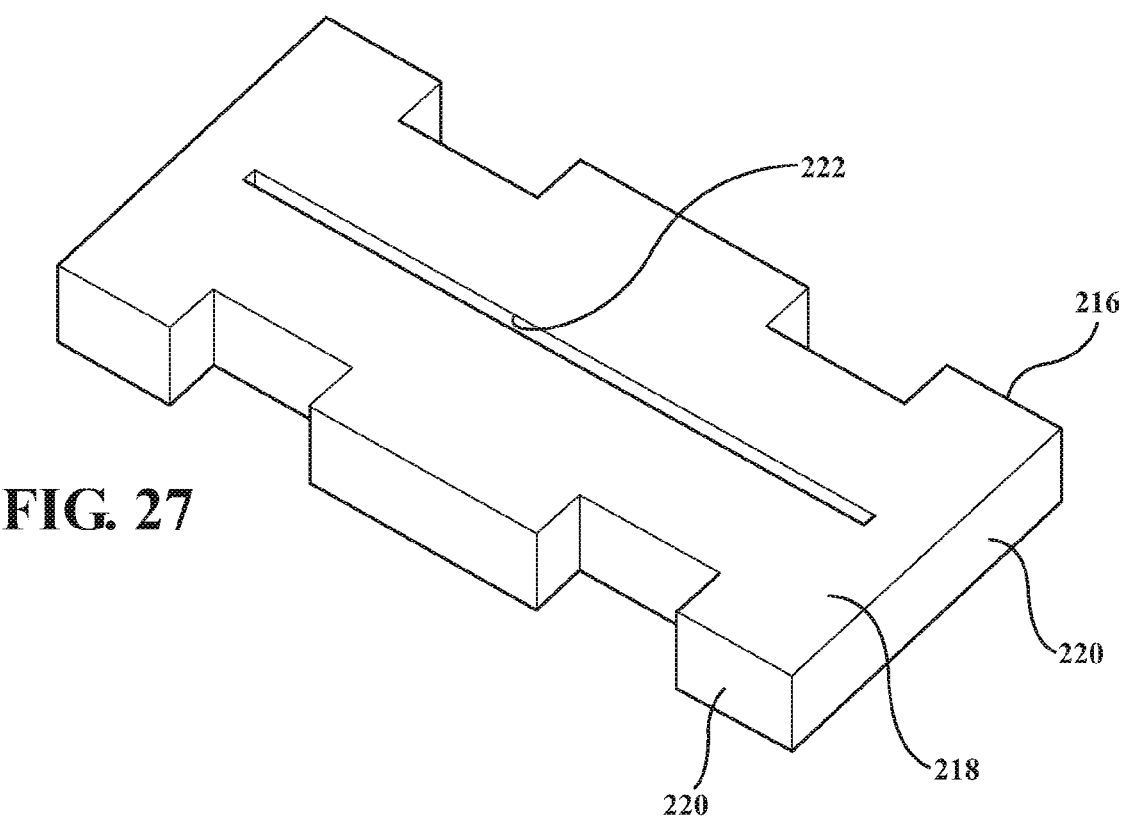
FIG. 27 is a perspective view of a seal.

As shown in FIG. 27, the protective cover 200 may include a seal 216 to fit over the blade 144 and on top of the sleeve 146. The seal 216 is generally rectangular in shape, but may be any suitable shape to mate with the sleeves 146. The seal 216 has a top wall 218 and side walls 220 extending from the top wall 221 to fit on a top of the sleeve 146. The seal 216 also has a slit 222 extending therethrough to allow the electrical blade 144 to extend therethrough. It should be appreciated that the seal 216 cooperates with the protective cover 200.

Figure 28:
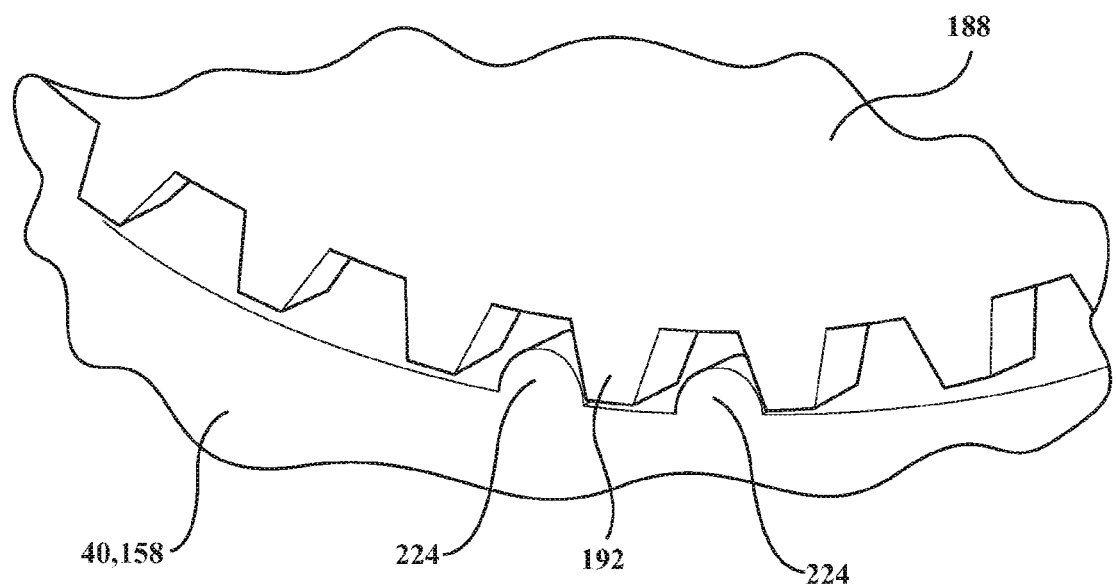
FIG. 28 is a partial perspective view of the device having two protrusions extending towards the intermediate gear.

As shown in FIG. 28, the housing of the device 40, 158 has two protrusions 224 extending toward the first gear 188 of the intermediate gear 176. Specifically, the two protrusions 224 are disposed between the plurality of teeth 192 of the first gear 188 to prevent rotation of the gear arrangement prior to seating the housing 48, 102 on the seating tray 38.

Figure 29:
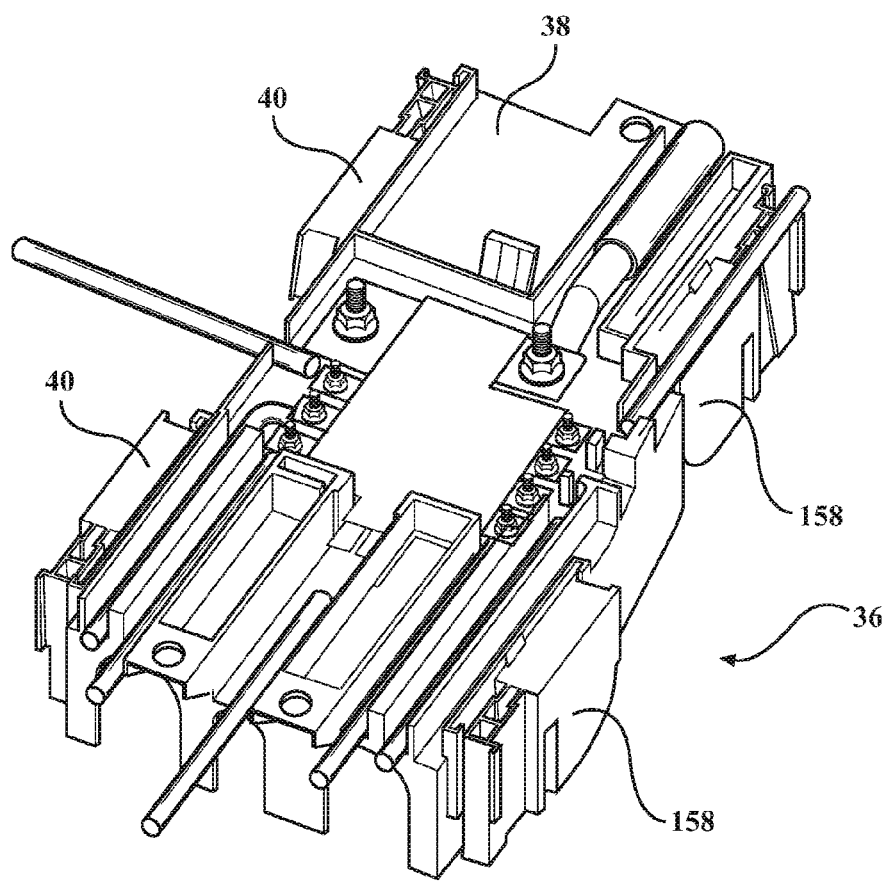
FIG. 29 is perspective view of the seating tray with electrical connections.

To assemble the power distribution assembly 30 as illustrated in FIG. 29, connections are made to the prefuse module assembly 36 on a bottom side of the seating tray 38. The cover 142 is installed and the seating tray 38 is attached to the vehicle (not shown). Vehicle connectors and battery attachment are installed on a top side of the seating tray 38. Turning to FIG. 1, the standard content assembly 32 and optional content assembly 34, if necessary, are set into place on the top of the seating tray 38. The actuators 52, 133 are depressed to lock the standard content assembly 32 and optional content assembly 34 in place and to make electrical connections.

As shown in FIG. 18, the actuator 52, 133 and extension 50, 70, 115, 120 are simultaneously engaging the mechanical advantage system 46. In operation, when the power distribution assembly 30 is to be closed, either actuator 52, 133 is pressed down by the operator in the first direction F1. The plurality of rack teeth 96, 134 of the actuators 52, 133, respectively, rotate the actuator gear 166. The actuator gear 166 rotates the intermediate gear 176 and the intermediate gear 176 rotates the extension gear 172.

Specifically, as the actuator 52, 133 is moved in the first direction F1, the plurality of teeth 168 of the actuator gear 166 engage the plurality of rack teeth 96, 134 of the actuator 52, 133 to rotate the actuator gear 166. The plurality of teeth 168 of the actuator gear 166 engage the plurality of teeth 192 of the first gear 188 of the intermediate gear 176 to rotate both of the first, second and third gears 190, 192 of the intermediate gear 176. The plurality of teeth 194 of the second gear 190 engage the plurality of teeth 184 of the input gear 180 and the plurality of teeth of the third gear engage and the plurality of teeth 186 of the output gear 184 to rotate both of the input and output gears 180, 184 of the extension gear 172.

In the embodiment shown, the plurality of teeth 184 of the input gear 180 of the extension gear 172 engage the plurality of rack teeth 66, 116 of the extension 50, 70, 115, 120 to move the standard content assembly 32 or optional content assembly 34 in the first direction F1 towards the prefuse module assembly 36. Specifically, the first and second housings 48, 102 are moved in the first direction F1 and is seated upon the seating tray 38 as shown in FIG. 21. It is to be appreciated that the extension 50, 70, 115, 120 may be disposed in either of the second channels 44 and engage either of the input gear 180 or output gear 182 of the extension gear 172. The actuator 52, 133 travels a greater distance in the first direction F1 than the extension 50, 70, 115, 120. The gear ratios of actuator, intermediate, and extension gears 166, 172, 176 convert the travel of the actuator 52, 133 into the mechanical advantage to move the extension 50, 70, 115, 120 a shorter distance in the first direction.

When the power distribution assembly 30 is to be opened, the actuator 52, 113 and the extension 50, 70, 115, 120 are disposed in the device. The actuator 52, 133 is pulled upwardly by the operator in the second direction F2. The plurality of rack teeth 96, 134 of the actuators 52, 133 respectively, rotate the actuator gear 166. The actuator gear 166 rotates the intermediate gear 176 and the intermediate gear 176 rotates the extension gear 172.

Specifically, as the actuator 52, 133 is moved in the second direction F2, the plurality of teeth 168 of the actuator gear 166 engage the plurality of rack teeth 96, 134 of the actuator 52, 133 to rotate the actuator gear 166. The plurality of teeth 168 of the actuator gear 166 engage the plurality of teeth 192 of the first gear 188 of the intermediate gear 176 to rotate both of the first, second and third gears 190, 192 of the intermediate gear 176. The plurality of teeth 194 of the second gear 190 engage the plurality of teeth 184 of the input gear 180 and the plurality of teeth of the third gear engage and the plurality of teeth 186 of the output gear 184 to rotate both of the input and output gears 180, 184 of the extension gear 172.

In the embodiment shown, the plurality of teeth 184 of the input gear 180 of the extension gear 172 engage the plurality of rack teeth 66, 116 of the extension 50, 70, 115, 120 to move the standard content assembly 32 or optional content assembly 34 in the second direction F2 away from the prefuse module assembly 36. Specifically, the first and second housings 48, 102 are moved in the second direction F2 and uncoupled from the seating tray 38 as shown in FIG. 20.

The actuator 52, 133 travels a greater distance in the second direction F2 than the extension 50, 70, 115, 120. The gear ratios of actuator, intermediate, and extension gears 166, 172, 176 convert the travel of the actuator 52, 133 into the mechanical advantage to move the extension 50, 70, 115, 120 a shorter distance in the second direction F2.

The present invention has been described in an illustrative manner, and it is to be understood that the terminology which has been used is intended to be in the nature of words of description rather than of limitation. It is also to be understood that the steps of the disclosed method can be performed in any order. Obviously, many modifications and variations of the present invention are possible in light of the above teachings. The inventions may be practiced otherwise than as specifically described within the scope of the appended claims.

What is claimed is:

1. A power distribution assembly for a vehicle, said power distribution assembly comprising:
   a seating tray;
   a device coupled to said seating tray and at least partially fixed relative to said seating tray with said device defining a first channel and a second channel spaced from said first channel, and said device having a mechanical advantage system in communication with said first and second channels;
   a housing selectively coupled to said seating tray;
   an extension affixed to said housing and movably disposed in said second channel of said device with said extension engaging said mechanical advantage system; and
   an actuator movably disposed in said first channel of said device with said actuator engaging said mechanical advantage system, said actuator movable in a first direction to actuate said mechanical advantage system and translate movement of said actuator to movement of said extension with said housing moving toward said seating tray during said movement of said extension.

2. A power distribution assembly as set forth in claim 1 wherein said extension engages said mechanical advantage system simultaneously as said actuator engages said mechanical advantage system.

3. A power distribution assembly as set forth in claim 1 wherein said mechanical advantage system translates movement of said actuator in said first direction to said extension such that said extension and housing move in said first direction.

4. A power distribution assembly as set forth in claim 1 wherein said mechanical advantage system is further defined as a gear arrangement for creating a mechanical advantage between said actuator and said extension.

5. A power distribution assembly as set forth in claim 4 wherein said gear arrangement is at least partially disposed between said extension and said actuator.

6. A power distribution assembly as set forth in claim 4 wherein said gear arrangement is includes an odd number of gears.

7. A power distribution assembly as set forth in claim 4 wherein said actuator has a plurality of rack teeth for engaging said gear arrangement in said first channel and said extension has a plurality of rack teeth for engaging said gear arrangement in said second channel.

8. A power distribution assembly as set forth in claim 4 wherein said gear arrangement includes an actuator gear in communication with said first channel for engaging said actuator and an extension gear in communication with said second channel for engaging said extension.

9. A power distribution assembly as set forth in claim 8 wherein said plurality of rack teeth of said actuator faces said actuator gear and said plurality of rack teeth of said extension faces said extension gear with both of said plurality of rack teeth of said actuator and said extension facing the same direction.

10. A power distribution assembly as set forth in claim 8 wherein said gear arrangement includes an intermediate gear disposed between said actuator gear and said extension gear such that said actuator and extension gears rotate in the same direction.

11. A power distribution assembly as set forth in claim 10 wherein said intermediate gear is further defined as a compound gear including a first gear engaging said actuator gear and a second gear engaging said extension gear.

12. A power distribution assembly as set forth in claim 11 wherein said first gear has a first diameter and said second gear has a second diameter smaller than said first diameter with the first and second gears mounted to each other to rotate in unison.

13. A power distribution assembly as set forth in claim 11 wherein said extension gear includes an input gear and an output gear coupled to each other to rotate in unison, with said input gear engaging said second gear of said intermediate gear and said output gear in communication with said second channel and engaging said extension.

14. A power distribution assembly as set forth in claim 13 wherein said extension gear defines a void between said input and output gears with said first gear of said intermediate gear movably disposed in said void.

15. A power distribution assembly as set forth in claim 9 wherein said extension gear is includes as an input gear and an output gear coupled to each other to rotate in unison, with said input gear engaging said intermediate gear and said an output gear engaging said extension.

16. A power distribution assembly as set forth in claim 15 wherein said input gear has an input diameter and said output gear has an output diameter equal to said input diameter.

17. A power distribution assembly as set forth in claim 1 wherein said seating tray has an exterior surface with said device coupled to said exterior surface.

18. A power distribution assembly as set forth in claim 1 wherein said actuator is movably coupled to said housing.

19. A power distribution assembly as set forth in claim 1 wherein said housing has a pair of housing sides spaced from each other and said extension is further defined as a first extension affixed to one of said pair of housing sides and further including a second extension affixed to an other of said pair of housing sides.

20. A power distribution assembly as set forth in claim 19 wherein said housing has a top portion and a bottom portion spaced from said top portion with said first and second extensions extending transverse from said bottom portion away from said top portion.

21. A power distribution assembly as set forth in claim 19 wherein said seating tray has a pair of tray sides spaced from each other and said device is further defined as a first device affixed to one of said pair of tray sides and further including a second device affixed to an other of said pair of tray sides with said first extension disposed in said second channel of said first device and said second extension disposed in a second channel of said second device.

22. A power distribution assembly as set forth in claim 21 wherein said actuator has a u-shaped configuration with a pair of legs spaced from each other with one of said pair of legs disposed in said first channel of said first device and an other of said pair of legs disposed in a first channel of said second device to distribute movement of said actuator.

23. A power distribution assembly as set forth in claim 1 wherein said actuator is further defined as a plurality of actuators spaced from each other and said extension is further defined as a plurality of extensions equal in number to said plurality of actuators.

24. A power distribution assembly as set forth in claim 23 wherein said device is further defined as a plurality of devices equal in number to said plurality of actuators with said plurality of devices spaced from each other to distribute the movement translated from said plurality of actuators.

25. A power distribution assembly as set forth in claim 1 wherein said housing is further defined as a first housing and further including a second housing selectively coupled to said seating tray.

* * * * *